United States Patent [19]
Yuasa et al.

[11] Patent Number: 5,238,523
[45] Date of Patent: Aug. 24, 1993

[54] APPARATUS FOR PRODUCING A LIQUID CRYSTAL OPTICAL DEVICE

[75] Inventors: Kimihiro Yuasa; Tetsuo Fujimoto; Kenji Hashimoto, all of Sodegaura, Japan

[73] Assignee: Idemitsu Kosan Co., Ltd., Tokyo, Japan

[21] Appl. No.: 877,242

[22] Filed: May 1, 1992

Related U.S. Application Data

[60] Division of Ser. No. 781,678, Oct. 24, 1991, Pat. No. 5,145,546, which is a continuation of Ser. No. 508,588, Apr. 13, 1990, abandoned.

[30] Foreign Application Priority Data

Apr. 21, 1989 [JP] Japan .................................. 1-99945
May 23, 1989 [JP] Japan .................................. 1-127891

[51] Int. Cl.$^5$ .......................... B32B 31/12; B05D 1/28; G02F 1/13
[52] U.S. Cl. .................................... 156/517; 156/519; 156/522; 156/548; 156/552; 156/555; 156/556; 156/583.1; 428/1; 359/36; 359/62; 359/76
[58] Field of Search ................. 359/75, 76, 62, 36; 428/1; 427/162, 164, 207.1, 346, 331, 384, 372.2, 429; 118/264, 256, 244, 253; 156/265, 324, 295, 291, 517, 519, 522, 548, 552, 556, 583.1, 264, 555, 578

[56] References Cited

U.S. PATENT DOCUMENTS

| | | | |
|---|---|---|---|
| 1,131,993 | 3/1915 | Chamberlin, Jr. et al. | 118/253 X |
| 1,529,192 | 3/1925 | Kotzer | 118/256 |
| 2,687,111 | 8/1954 | Deniston | 118/256 |
| 3,227,073 | 1/1966 | Reich | 118/264 |
| 3,863,562 | 2/1975 | Jack | 156/582 X |
| 4,094,058 | 6/1978 | Yasukate et al. | |
| 4,179,325 | 12/1979 | Staats et al. | 118/256 X |
| 4,370,356 | 1/1983 | Bok et al. | 118/244 X |
| 4,455,185 | 6/1984 | Sasaki et al. | |
| 4,597,636 | 7/1986 | Hoshikawa | |
| 4,850,683 | 7/1989 | Kawaguchi et al. | 428/1 X |
| 4,973,373 | 11/1990 | Hashimoto et al. | 428/1 X |
| 5,069,533 | 12/1991 | Yuasa | 359/76 |

Primary Examiner—Jeff H. Aftergut
Attorney, Agent, or Firm—Antonelli, Terry, Stout & Kraus

[57] ABSTRACT

A substrate coated with a film of liquid crystal material having a uniform thickness is produced efficiently by applying the liquid crystal material to the electrode side of a substrate using an impregnating matter impregnated with the liquid crystal material, and such a method ensures uniform thickness even for a film of liquid crystal material having a large area. A liquid crystal optical device having a uniform optical quality and a large area is produced efficiently by coating a flexible substrate with a film of liquid crystal material using the method described above, laminating the coated flexible substrate with another flexible substrate, with the film of the liquid crystal material disposed between the electrode sides of the flexible substrates, and orienting the liquid crystal material in thus obtained laminate by subjecting the laminate to bending treatment.

16 Claims, 7 Drawing Sheets

APPARATUS FOR PRODUCING A LIQUID CRYSTAL OPTICAL DEVICE

CROSS REFERENCE TO RELATED APPLICATION

This application is a Divisional application of application Ser. No. 781,678, filed on Oct. 24, 1991, now U.S. Pat. No. 5,145,546, which is a continuation of U.S. patent application Ser. No. 07/508,588, filed on Apr. 13, 1990, now abandoned.

BACKGROUND OF THE INVENTION (a) Field of the Invention

The present invention relates to a method of producing a substrate coated with a film of liquid crystal material, which may be used for producing liquid crystal optical devices, including liquid crystal display devices, liquid crystal memory devices, and liquid crystal acoustic devices. The present invention further relates to a method of producing a liquid crystal optical device using the method of producing a substrate coated with a film of liquid crystal material, and to an apparatus to be used for the method of producing the liquid crystal optical device.

(b) Description of the Related Art

In common methods for coating a substrate with a film of liquid crystal material, offset lithography or a bar coater have been used for applying liquid crystal to substrates. For example, in Japanese Patent Application Kokai Koho (Laid-open) No. 64-6922, disclosed is a method using a kind of bar coater, wherein a liquid crystal is applied to a substrate using a bar or a spatula, thereby performing orientation treatment simultaneously using the shear force generated by the application. However, since the liquid crystal is directly applied as it is in the method, some liquid crystals having high viscosity, such as polymer liquid crystals, need reduction of application speed or heating during application, which decrease the productivity.

In Japanese Patent Application Kokai Koho (Laid-open) No. 60-75817, there is disclosed an efficient method of producing liquid crystal optical devices, by which a liquid crystal optical device is produced by applying a liquid crystal to a substrate using offset lithography and, thereafter, pressing an opposed substrate to the coated substrate. Offset lithography however has difficulties in producing thin film of liquid crystal and cannot always produce film of a good quality. Therefore, the method using offset lithography is unfit for production of devices requiring very thin cell thickness (less than several $\mu m$), such as ferroelectric liquid crystal devices. The method has another problem that since the orientation techniques employed in the method, for example rubbing technique, require a step of slow cooling, the improvement of productivity is not particularly remarkable.

SUMMARY OF THE INVENTION

An object of the present invention is to provide an easy and efficient method for producing a substrate coated with a film of liquid crystal material which has uniform and good quality and large area.

Another object of the present invention is to provide an efficient method for producing a liquid crystal optical device having uniform quality and large area in a high yield.

More another object of the present invention is to provide an apparatus for producing a liquid crystal optical device, which can be suitably used for the above-described method of producing a liquid crystal optical device.

That is, the present invention provides a method of producing a substrate coated with a film of liquid crystal material wherein the substrate bears an electrode structure on its surface and the electrode side of the substrate is coated with the film of liquid crystal material, comprising: applying the liquid crystal material to the electrode side of the substrate by pressing an impregnating matter impregnated with the liquid crystal material to the electrode side of the substrate while the area in which the impregnating matter and the substrate is in contact with each other is moved.

According to the method of the present invention, a uniform film of liquid crystal material having large area can be efficiently and easily formed on a substrate. Further, the impregnating matter absorbs dust on the substrate, thereby reducing accidental continuity between two electrode structures facing each other in a very thin device.

The present invention further provides a method of producing a liquid crystal optical device wherein a liquid crystal material is enclosed between two flexible substrates bearing on their surfaces facing each other their respective electrode structures, comprising the steps of:

(a) applying a liquid crystal material to the electrode side of one of the flexible substrates by pressing an impregnating matter impregnated with the liquid crystal material to the electrode side of the flexible substrate while the area in which the impregnating matter and the flexible substrate is in contact with each other is moved, to coat the electrode side of the flexible substrate with a film of the liquid crystal material;

(b) laminating the flexible substrate coated with the film of liquid crystal material with the other flexible substrate, with the film of the liquid crystal material disposed between the electrode sides of the flexible substrates, to form a laminate;

(c) orienting the liquid crystal material in the laminate by subjecting the laminate to bending treatment.

The method of producing a liquid crystal optical device of the present invention makes it possible to produce efficiently liquid crystal optical devices which have uniform optical quality and a large area, and are free from accidental continuity between electrode structures facing each other.

The present invention further provides an apparatus for producing a liquid crystal optical device wherein a liquid crystal material is enclosed between two flexible substrates having on their surfaces facing each other their respective electrode structures, comprising:

(a) a conveyer means for conveying one of the flexible substrates;

(b) an application means for applying the liquid crystal material to the electrode side of the flexible substrate conveyed by the conveyer means using an impregnating matter impregnated with the liquid crystal material;

(c) a lamination means for laminating the flexible substrate coated with the liquid crystal material with the other flexible substrate, with the liquid crystal material disposed between the electrode sides of the flexible substrates, to form a laminate; and (d) an orientation means for orienting the liquid crystal material in the laminate by subjecting the laminate to bending treatment.

The apparatus may be suitably used for the method of producing a liquid crystal optical device of the present invention, and by using the apparatus, liquid crystal optical devices having uniform optical quality and large area and being free from accidental continuity can be produced continuously and efficiently.

BRIEF DESCRIPTION OF THE DRAWINGS

FIG; 11(a) illustrates an apparatus and a method for producing a liquid crystal optical device in accordance with an embodiment of the present invention, for particularly showing processes of producing a liquid crystal optical device using two cut-sheets of flexible substrates as the two flexible substrates to be used for the method.

DESCRIPTION OF THE PREFERRED EMBODIMENTS

Figure 1:
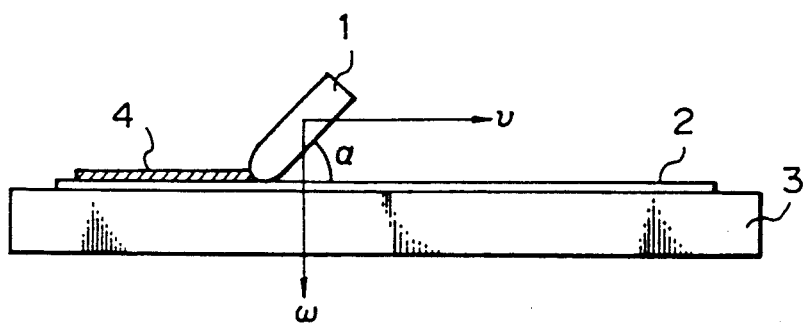
FIG. 1 and FIG. 3 are schematic side views showing apparatuses by which the method of producing a substrate coated with a film of liquid crystal material according to the present invention is put into practice, respectively.

The liquid crystal material to be used in the present invention is not particularly limited, with the proviso that it exhibits properties of liquid crystals. Some examples of the liquid crystal material which may be used include low molecular weight nematic liquid crystals, low molecular weight cholesteric liquid crystals, low molecular weight smectic liquid crystals, polymer nematic liquid crystals, polymer cholesteric liquid crystals, polymer smectic liquid crystals, and mixtures thereof. Low molecular weight and polymer liquid crystal materials and mixtures thereof which exhibit ferroelectricity may be suitably used. Ferroelectric liquid crystals are preferable because of their high speed response to the changes of electric field and their ability of making high contrast. Improved orientation state can be made by using a liquid crystal material which contains ferroelectric polymer liquid crystals in an amount of not less than 5 mol %, more preferably not less than 10 mol % of the total of liquid crystals used.

Some examples of ferroelectric polymer liquid crystals include polymer liquid crystals having polyacrylate main chain, polymer liquid crystals having polymethacrylate main chain, polymer liquid crystals having polychloroacrylate main chain, polymer liquid crystals having polyoxirane main chain, polymer liquid crystals having polysiloxane main chain, and polymer liquid crystals having polyester main chain.

Some examples of the polymer liquid crystals having polyacrylate main chain include those having the following structures;

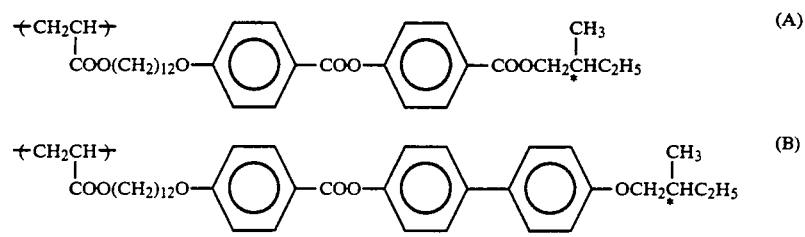

Some examples of the polymer liquid crystals having polymethacrylate main chain include those having the following structures;

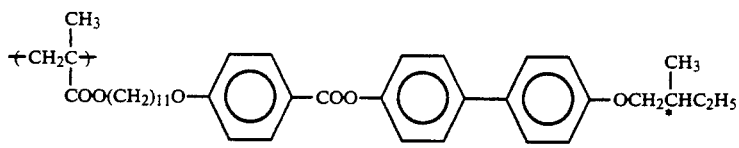
(C)

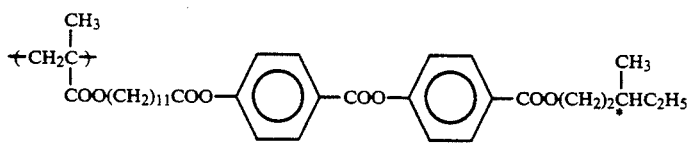
(D)

Some examples of the polymer liquid crystals having polyester main chain include those having the following structure;

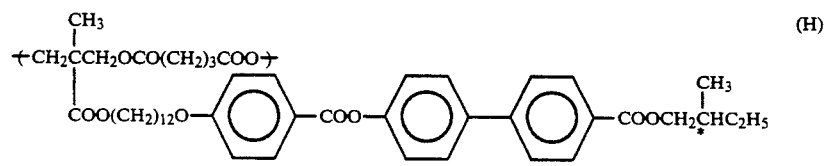
(H)

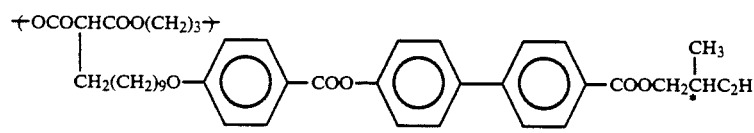
(I)

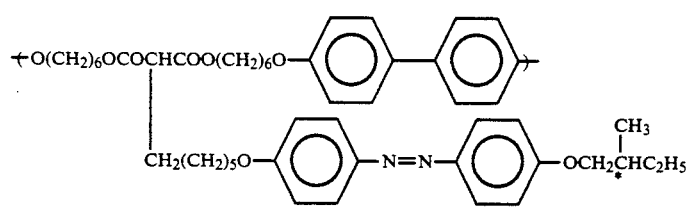
(J)

Some examples of the polymer liquid crystals having polychloroacrylate main chain include those having the following structures;

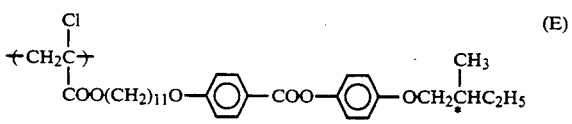
(E)

An example of the polymer liquid crystals having polyoxirane main chain has the following structure;

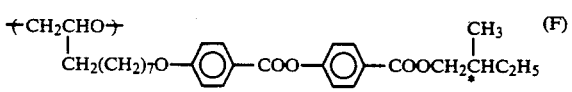
(F)

An example of the polymer liquid crystals having polysiloxane main chain has the following structure;

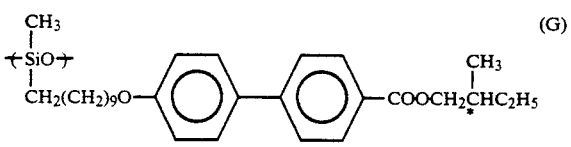
(G)

The mesogenic portion in the side chain of each above polymer liquid crystal may be replaced by biphenyl skeleton, phenyl benzoate skeleton, biphenyl benzoate skeleton, or phenyl 4-phenylbenzoate skeleton. Further, each benzene ring in each of the skeletons may be replaced by pyrimidine ring, pyridine ring, pyridazine ring, pyrazine ring, tetrazine ring, cyclohexane ring, dioxane ring, or dioxoborinane ring, and may have substituents including halogens, such as fluorine and chlorine, and cyano group. The optically active end groups also may be replaced by other various optically active groups including 1-methylalkyl groups, 2-fluoroalkyl groups, 2-chloroalkyl groups, 2-chloro-3-methylalkyl groups, 2-(trifluoromethyl)alkyl groups, 1-alkoxycarbonylethyl groups, 2-alkoxy-1-methylethyl groups, 2-alkoxypropyl groups, 2-chloro-1-methylalkyl groups, and 2-alkoxycarbonyl-1-(trifluoromethyl)propyl groups, or by these other optically active groups through ester bond or ether bond. The length of spacer (length of methylene chain) may also be varied within a range of from 1 to 30.

The preferred number average molecular weight of the above-described ferroelectric polymer liquid crystals is 1,000 to 200,000.

Some examples of ferroelectric low molecular weight liquid crystals which may be used include Schiff base ferroelectric low molecular weight liquid crystals, azo and azoxy ferroelectric low molecular weight liquid crystals, biphenyl and aromatics ester ferroelectric low molecular weight liquid crystals, ferroelectric low molecular weight liquid crystals having substituents such as halogens or cyano groups on their rings, and ferroelectric low molecular weight liquid crystals having heterocycles.

Some examples of Schiff base ferroelectric low molecular weight liquid crystals include the following compounds (1) to (4).

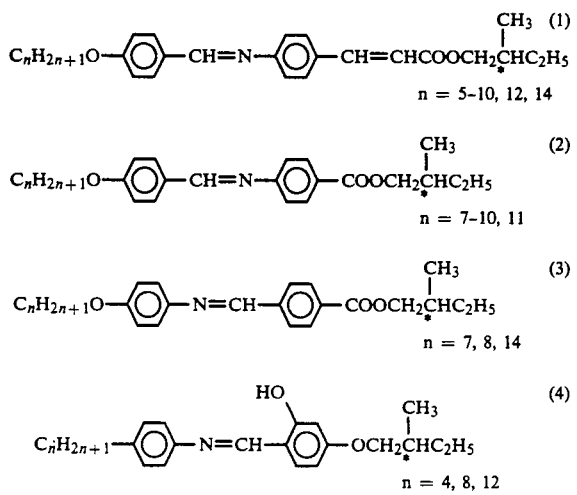

Some examples of azo and aoxy ferroelectric low molecular weight liquid crystals include the following compounds (5) and (6).

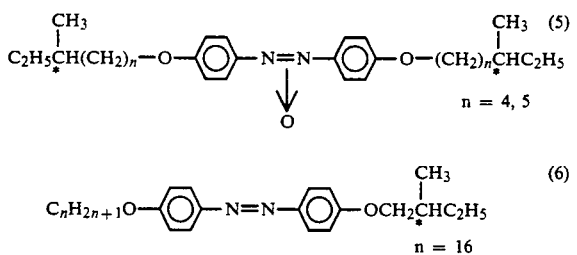

Some examples of biphenyl and aromatics ester ferroelectric low molecular weight liquid crystals include the following compounds (7) and (8).

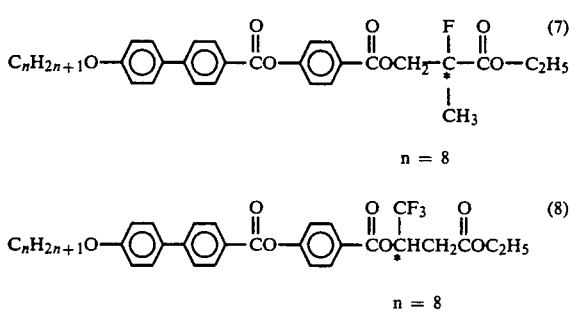

Some examples of ferroelectric low molecular weight liquid crystals having substituents such as halogens or cyano group on their rings include the following compounds (9) to (11).

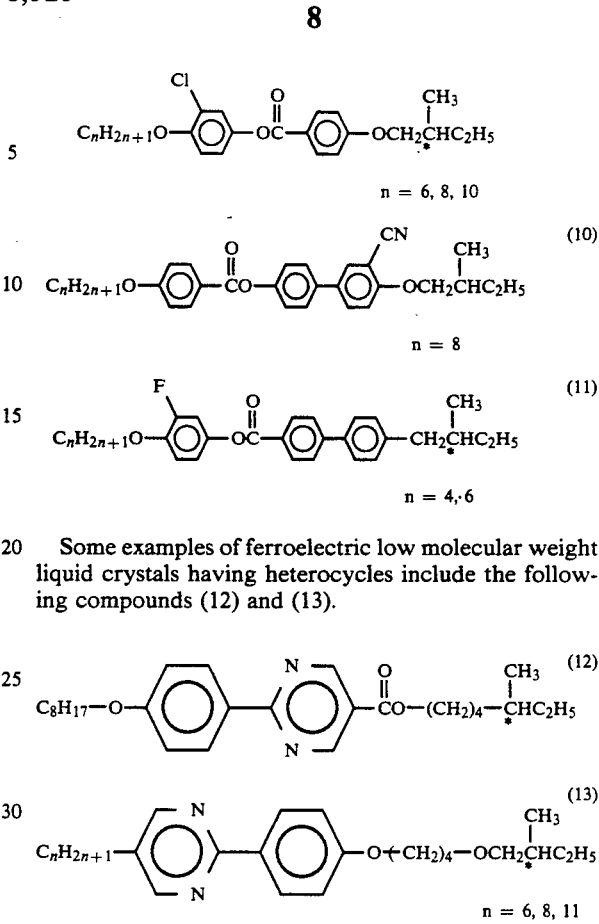

Some examples of ferroelectric low molecular weight liquid crystals having heterocycles include the following compounds (12) and (13).

The above-described compounds are typical examples of ferroelectric low molecular weight liquid crystals, and the ferroelectric low molecular weight liquid crystals which may be used in the present invention are not limited to these compounds.

Non-liquid-crystalline polymers may be added into the above-described liquid crystal materials in an amount of not more than 60% by weight of the total of the liquid crystal materials and the non-liquid-crystalline polymers in order to improve the mechanical strength of liquid crystal panels and to make the liquid crystal material easy to orient using bending orientation technique. The polymers which may be added include thermoplastic resins and crosslinkable resins. Among these non-liquid crystalline polymers, the particularly preferred are those commonly used as adhesive.

The preferred thermoplastic resins have a glass transition point (Tg) of not lower than 30° C., more preferably not lower than 70° C.

Some illustrative examples of such thermoplastic resins include
polymers or copolymers of vinyl halide, including polyvinylchloride, polyvinylbromide, polyvinylfluoride, vinyl chloride-vinyl acetate copolymer, vinyl chloride-ethylene copolymer, vinyl chloride-propylene copolymer, vinyl chloride-vinylidene chloride copolymer, vinyl chloride-butadiene copolymer, vinyl chloride-acrylic ester copolymers, vinyl chloride-acrylonitrile copolymer, vinyl chloride-styrene-acrylonitrile terpolymer, vinyl chloride-vinylidene chloride-vinyl acetate terpolymer, polyvinylidenechloride, polytetrafluoroethylene, polytetrafluorochloroethylene, and polyfluorovinylidene;

polymers or copolymers of unsaturated alcohols or unsaturated ethers, including polyvinylalcohol, polyallylalcohol, polyvinylethers, and polyallylethers;

polymers or copolymers of unsaturated carboxylic acids such as acrylic acid or methacrylic acid;

polymers or copolymers of ester compounds, the ester compound having an unsaturated bond in alcohol residue, including polyvinylesters, such as polyvinylacetate, and polyallylesters, such as polyphthalic acid;

polymers or copolymers of ester compounds having an unsaturated bond in acid residue or both in acid residue and in alcohol residue, including polyacrylic esters, polymethacrylic esters, polymaleic esters, and polyfumaric esters;

polymers or copolymers of unsaturated nitriles, including polymer or copolymers of acrylonitrile, polymer or copolymers of methacrylonitrile, polyvinylidenecyanide, polymer or copolymers of malononitrile, and polymer or copolymers of fumaronitrile;

polymers or copolymers of aromatic vinyl compounds, including polystyrene, poly-α-methylstyrene, poly-p-methylstyrene, styrene-α-methylstyrene copolymer, styrene-p-methylstyrene copolymer, polyvinylbenzene, and polystyrene halides;

polymers or copolymers of heterocyclic compounds, including polyvinylpyridine, poly-N-vinylpyrolidine, and poly-N-vinylpyrolidone;

polyester condensation polymers, including polycarbonates, and polyamide condensation polymers, for example, nylon 6 and nylon 6,6.;

polymers or copolymers each containing one or more kinds of units selected from maleic anhydride unit, maleimide unit, fumaric anhydride unit, and fumarimide unit; and heat-resisting organic high molecular compounds, including polyamide-imides, polyetherimides, polyimides, polyphenyleneoxide, polyphenylenesulfide, polysulfone, polyethersulfones, and polyallylate.

The adhesives, which may be used separately or may be added to the liquid crystalline material, may be various polymers which have been commonly used as adhesive, including epoxy adhesives, acrylic adhesives, polyurethane adhesives, hot melt adhesives, and elastomer adhesives.

Further, other additives, such as polychromatic coloring matters or agents for reducing viscosity, may also be added to the liquid crystal material.

Some examples of polychromatic coloring matters include styryl coloring matters, azomethine coloring matters, azo coloring matters, naphthoquinone coloring matters, anthraquinone coloring matters, merocyanine coloring matters, benzoquinone coloring matters, and tetrazine coloring matters.

The substrate bearing an electrode structure may be any substrate which has been commonly used in preparation of liquid crystal optical devices. In preparation of liquid crystal optical devices, two substrates are used, at least one of which is transparent substrate bearing a transparent electrode structure. Some examples of the transparent substrate which may be used in the present invention are plastic substrates made of plastics, including crystalline polymers, such as uniaxially or biaxially stretched polyethyleneterephthalate; non-crystalline polymers, such as polysulfone and polyether sulfone; polyolefins, such as polyethylene and polypropylene; polycarbonates; polyamides such as nylons. Some examples of the transparent electrode which may be used include NESA film covered with tin oxide and ITO film comprising tin oxide and indium oxide. These transparent electrode structure may be provided on the surface of the substrate using various known techniques, such as spattering technique, vacuum evaporation technique, printing technique, application technique, plating technique, bonding technique, or combination thereof.

The impregnating matter may be of any material which can be impregnated with a liquid crystal material being in a state of isotropic liquid or with a solution of liquid crystal material. For example, the impregnating matter may be of a material selected from the group consisting of a cloth made of fibers, a felt made of fibers, a bundle of fibers, and porous sponge materials.

Examples of porous sponge materials include porous matters of inorganic oxides (porous glass) and porous matters of high molecular compounds. A typical example of the porous matters of inorganic oxides is porous glass of silica, which is obtainable by hydrolyzing a tetraalkoxysilane, in a sol-gel reaction medium selected from water or a water-miscible organic solvent, in acidic or basic pH condition, until gelation is completed, and then removing residual solvent. Some examples of porous glass other than porous glass of silica include porous glass of oxides of lithium, sodium, potassium, rubidium, cesium, magnesium, calcium, strontium, barium, titanium, zirconium, vanadium, tantalum, chromium, molybdenum, tungsten, manganese, iron, nickel, cobalt, copper, zinc, cadmium, boron, aluminum, phosphorus, gallium, germanium, tin, arsenic, antimony, bismuth, and selenium. Porous glass may also be produced by various methods other than the above-described method, for example, the methods disclosed in U.S. Pat. No. 4,528,010, including Vicor (Corning) method, chemical deposition method, white carbon method, colloid silica method, and silica gel method.

Typical examples of the porous matters of high molecular compounds include porous matters of synthetic polymer compounds, such as polyacrylonitrile, polymethacrylonitrile, polyamides, polyesters, polycarbonates, polypropylene, polyethylene, polystyrene, polyvinylidenefluoride, polyvinylchloride, polyvinylfluoride, polysulfones, polymethylmethacrylate, polyvinylalcohol, polyvinylacetate, polyurethane, and silicone, and natural high molecular compounds, such as cellulose, cellulose acetate, collagen, and keratin. Some concrete examples include polypropylene porous sheet (MICROFILTER DURAGUARD 3510 (trade name) produced by Celanease Co., Ltd.) and polycarbonate porous sheet (NUCLEPORE (trade name) produced by Celanease Co., Ltd.).

In order to reduce generation of dust and static electricity during application, various wiper materials for clean room may be suitably used. For example, BELLCLEAN (trade name, produced by Kanebo, Ltd.), CREW (trade name, produced by Jujo Kimberly Co., Ltd.), and KIMTEC (trade name, produced by Jujo Kimberly Co., Ltd.) may be suitably used.

Impregnation of an impregnating matter with a liquid crystal material is performed by impregnating the impregnating matter with a solution of liquid crystal material prepared by dissolving the liquid crystal material in a solvent, or by impregnating the impregnating matter with a liquid crystal material at a temperature at which the liquid crystal material is in a state of isotropic liquid.

Some examples of the solvent which may be suitably used for preparation of the solution of the liquid crystal material include methylene chloride, chloroform, toluene, xylene, tetrahydrofuran, methyl ethyl ketone, dimethylacetamide, or dimethylformamide.

Some embodiments of the method of producing a substrate coated with a film of liquid crystal material will now be described by way of example with reference to FIG. 1 through FIG. 4.

Figure 2:
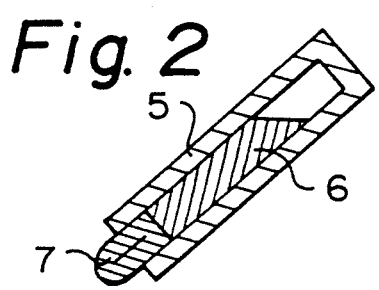
FIG. 2 is an enlarged sectional view of the application head of the apparatus shown in FIG. 1.

FIG. 1 is a schematic view illustrating a liquid crystal material being applied to a substrate in accordance with an embodiment of the present invention, and a reference numeral 1 represents an application head, an enlarged sectional view of which is shown in FIG. 2. The application head 1 has a rectangular container 5 and a impregnating matter 7 which is inserted in the opened bottom of the container 5. The container 5 contains a liquid crystal material 6 which is in an isotropic liquid state or in s state of solution. The reference numeral 2 represents a substrate bearing an electrode structure on one surface, which is supported on a flat metal plate 3 with its electrode side looking upward. The application head 1 is tilted to make an angle α between it and the substrate 2, and is moving at a moving speed v while it is pressing the impregnating matter 7 to the electrode side of the substrate 2 at a pressure w. A reference numeral 4 represents a film of liquid crystal material formed by the move of the application head 1, i.e. by the move of the impregnating matter 7 impregnated with the liquid crystal material.

Figure 3:
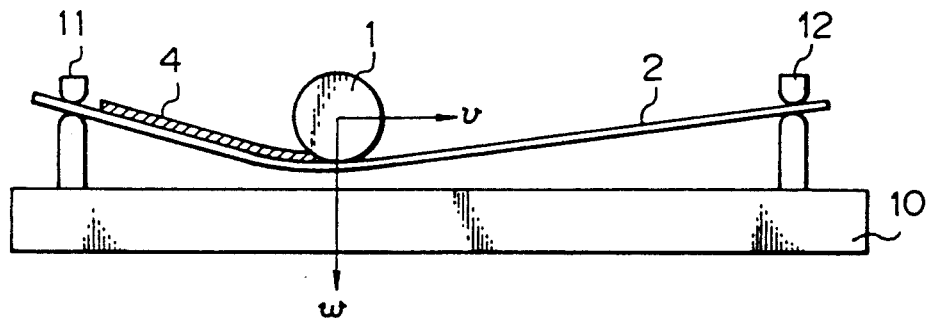
Figure 4:
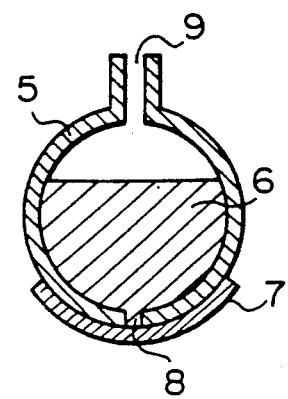
FIG. 4 is an enlarged sectional view of the application head of the apparatus shown in FIG. 3.

Referring to FIG. 3 which shows an embodiment wherein a flexible substrate is used as the substrate, a flexible substrate 2 is supported near its two opposed edges by two supporting means 11 and 12 installed on a bed plate 10. A film of liquid crystal material 4 is formed using a cylindrical application head 1 which is moving at a moving speed v while pressing the flexible substrate 2 down at a pressure of w. Preferably, the supporting means 11 and 12 are so installed that they can be moved on the bed plate 11 from side to side, thereby controlling properly the tension of the flexible substrate 2 by moving the supporting means 11 and 12. FIG. 4 is an enlarged sectional view of the cylindrical application head 1 shown in FIG. 3. As shown in FIG. 4, at least one minute hole 8 is made in the bottom of a cylindrical container 5 containing a liquid crystal material 6 which may be in an isotropic liquid state or in a state of solution, and an impregnating matter 7 is attached to the lower portion of the cylindrical container 5 so that the minute hole 8 is covered with the impregnating matter 7. A reference numeral 9 represents a hole 9 for pouring the liquid crystal material into the container 5 and for adjusting the internal pressure in the container 5. The liquid crystal material 6 poured into the container 5 through the hole 9 is fed to the impregnating matter 7 through the minute hole 8, thereby impregnating the impregnating matter 7 with the liquid crystal material. The amount of the liquid crystal material to be applied to the substrate 2 can be controlled by controlling the amount of the liquid crystal material poured into the container 5 or by controlling the internal pressure in the container 5.

Referring to FIG. 2 and FIG. 4, the impregnating matter 7 is continuously impregnated with a liquid crystal material because the impregnating matter 7 is directly inserted into the container 5 containing the liquid crystal material being in an isotropic liquid state or a solution of the liquid crystal material. Alternatively, impregnation of the impregnating matter 7 with a liquid crystal material may be conducted intermittently by connecting the container 5 through a tube with an apparatus for delivering intermittently constant amounts of the liquid crystal material being in an isotropic liquid state or in a state of solution, and thereby feeding intermittently constant amounts of the liquid crystal material to the container 5. In another way, impregnation of an impregnating matter with a liquid crystal material may be performed by immersing the impregnating matter into a container containing the liquid crystal material being in an isotropic liquid state or a solution of liquid crystal material.

According to the present invention, application of a liquid crystal material is made by pressing an impregnating matter impregnated with the liquid crystal material to the electrode side of the substrate at a constant pressure or at changing pressure (w), while the area in which the impregnating matter and the electrode side of the substrate is in contact with each other is moved at a moving speed v. The impregnating matter may be moved once on the desired area of the electrode side of the substrate, or may be moved a plural times on the desired area to carry out repetitive application. Repetitive application may also be conducted by reciprocating the impregnating matter. The pressure w and the moving speed v are not particularly limited. Generally, the preferred pressure w is not more than 3 kg/cm$^2$, more preferably from 50 to 1 kg/cm$^2$. Generally, the preferred moving speed v is not more than 20 m/sec., more preferably 0.5 to 10 m/sec. These conditions may be varied according to the viscosity of the liquid crystal material used, i.e. the viscosity of the liquid crystal material which is in an isotropic liquid state or in a state of solution, the concentration of the liquid crystal material in the solution of liquid crystal material used, the temperature of the substrate, and the required thickness of the film of liquid crystal material. The thickness of film depends largely on the moving speed, and generally, the larger the moving speed, the larger the shearing force generated at the area where the impregnating matter is in contact with the substrate. As the result, when the moving speed is increased, the amount of the liquid crystal material in an isotropic liquid state or the solution of liquid crystal material fed to the impregnating matter increases, thereby increasing the thickness of the resulting film.

The area in which the impregnating matter and the electrode side of the substrate is in contact with each other may be small in area, i.e. may be linear in shape, or may be large in area. In order to improve the surface quality of the obtained film, it is preferable to enlarge the contacting area, or, when the contacting area is small as shown in FIG. 1 and FIG. 2, it is preferable to tilt the application head 1, thereby making the angle α (the angle between the impregnating matter 7 and the electrode 2) smaller.

Thus obtained substrate bearing an electrode structure and a film of liquid crystal material may be used for producing liquid crystal optical devices. That is, liquid crystal optical devices can be produced by using thus obtained substrate bearing an electrode structure and a film of liquid crystal material through a process of several steps, including the step of laminating another substrate, the step of orienting the liquid crystal material, and the step of attaching polarizing plates.

The method used in the step of laminating another substrate is not particularly limited. For example, lamination may be carried out by coating the surface of the film of liquid crystal material of thus obtained substrate and the electrode side of the other substrate with an adhesive, and then bringing the two surfaces coated with the adhesive into contact with each other. Adhesive may be applied to only one of the two substrates, with the other coated with no adhesive.

In the step of orienting the liquid crystal material, any conventional technique may be used. For example, rubbing technique, oblique vacuum evaporation technique, temperature gradient technique, technique using electric field or magnetic field, shearing technique, and stretching technique may be used. Particularly, in cases where both the substrates used are flexible substrates such as plastic substrates, bending orientation using a set of rolls may be suitably used.

The step of attaching polarizing plates may also be conducted using common techniques. When light and darkness are to be displayed using birefringence effect, two polarizing plates are attached to both sides of the produced device. The polarizing axes of the two polarizing plates are arranged properly. When the liquid crystal material contains polychromatic coloring matters to carry out display in guest-host mode, only one polarizing plate is required.

As described above, by the method of producing a substrate coated with a film of liquid crystal material according to the present invention, uniform film of liquid crystal material having large area can be produced effectively and easily. Further, because the impregnating matter absorbs dust on substrates, accidental continuity between two electrode structures facing each other can be reduced even in very thin devices.

Hereinafter, the method of producing a liquid crystal optical device of the present invention will be described. The method of producing a liquid crystal optical device of the present invention is characterized in that the above-described method of producing a substrate coated with a film of liquid crystal material is used for providing a film of liquid crystal material, in that two flexible substrates bearing their respective electrode structures are used as the substrates of the liquid crystal optical device, and in that bending orientation is used for orienting the liquid crystal material.

The two flexible substrates to be used in the present invention are not particularly limited, with the proviso that at least one of the flexible substrates is a transparent substrate. The transparent substrates and transparent electrodes described in the description of the method of producing a substrate coated with a film of liquid crystal material may also be suitably used in this method as the transparent substrate and the transparent electrode carried by the transparent substrate.

Further, each flexible substrate may be either a lengthy flexible substrate or a cut-sheet of flexible substrate.

The liquid crystal material to be used in the present invention is the same liquid crystal material that may be used for the method of producing a substrate coated with a film of liquid crystal material of the present invention, including polymer liquid crystals, low molecular weight liquid crystals or mixtures thereof. In order to obtain liquid crystal optical devices having high speed of response to changes of electric field and having ability of showing high contrast, it is preferable to use ferroelectric liquid crystal materials as mentioned above. According to demand, the liquid crystal material may also contain additives, such as adhesives, other non-liquid-crystalline polymers, agents for reducing viscosity, and polychromatic coloring matters, as described above.

Step of Application

As described above, application of a liquid crystal material to a flexible substrate is performed by impregnating an impregnating matter with a liquid crystal material which is in an isotropic liquid state or in a solution state prepared by dissolving the liquid crystal material in a solvent, and then pressing the impregnating matter impregnated with the liquid crystal material to the electrode side of the flexible substrate while the area in the electrode side of the flexible substrate in which the electrode side of the flexible substrate is in contact with the impregnating matter is being moved, thereby coating the electrode side of the flexible substrate with a film of the liquid crystal material. When a solution of liquid crystal material is used, the solvent in the solution is evaporated out to form a film of the liquid crystal material.

Application of the liquid crystal material to predetermined plural areas of a substrate may be performed efficiently by conducting application intermittently in a certain manner.

In the method of present invention, the intermittent application can be performed efficiently in such a manner that, while the area in the electrode side of the flexible substrate in which the electrode side of the flexible substrate is in contact with the impregnating matter is being moved by moving the flexible substrate, the impregnating matter impregnated with the liquid crystal material is moved intermittently up and down in a vertical line so that the impregnating matter is intermittently brought into contact with the electrode side of the flexible substrate.

Also, the intermittent application can be conducted efficiently in such a manner that, while the area in the electrode side of the flexible substrate in which the electrode side of the flexible substrate is in contact with the impregnating matter is being moved by moving the flexible substrate, the impregnating matter is moved periodically round a stationary point over the electrode side of the flexible substrate so that the impregnating matter is intermittently brought into contact with the electrode side of the flexible substrate.

Further, the intermittent application also can be performed efficiently in such a manner that, while the position of the impregnating matter is fixed and the area in the electrode side of the flexible substrate in which the electrode side of the flexible substrate is in contact with the impregnating matter is being moved by moving the flexible substrate, the flexible substrate is moved intermittently up and down in a vertical line so that the impregnating matter is intermittently brought into contact with the electrode side of the flexible substrate.

More further, the intermittent application can be conducted efficiently in such a manner that the flexible substrate is supported by a supporting structure and, while the area in the electrode side of the flexible substrate in which the electrode side of the flexible substrate is in contact with the impregnating matter is being moved by moving the flexible substrate, with the position of the impregnating matter fixed, the supporting structure is moved intermittently up and down in a vertical line so that the impregnating matter is intermittently brought into contact with the electrode side of the flexible substrate.

The impregnating matter to be used in this method is the same as that described in the method of producing a substrate coated with a film of liquid crystal material.

Step of Lamination

Subsequently, the flexible substrate coated with a film of liquid crystal material is laminated with the other flexible substrate, with the film of the liquid crystal material disposed between the electrode sides of the flexible substrates, to form a laminate. In cases where both the flexible substrate coated with a film of liquid crystal material and the other substrate are lengthy substrates, such as rolled lengthy substrates, it is preferable to conduct lamination using a pair of lamination rolls consisting of two rolls. Preferably, at least one of the two rolls is able to be heated.

In cases where one of the flexible substrate coated with a film of liquid crystal material and the other flexible substrate is a lengthy flexible substrate, and the other is a cut-sheet of flexible substrate, it is preferable to conduct lamination using a laminator consisting of one plate and one roll. Lamination using such a laminator is conducted by moving the pressing position between the roll and the plate in a certain direction. It is desirable that the temperature of at least one of the roll and the plate is controllable so that it can be heated.

Laminating speed is preferably 0.1 to 50 m/min, more preferably 0.5 to 10 m/min. The pressure during lamination is preferably 0 to 5 kg/cm$^2$, more preferably 1 to 2 kg/cm$^2$. The temperature during lamination is preferably in the range of from room temperature +10° C. to the clearing temperature of the liquid crystal material (transition temperature from liquid crystal phase to isotropic phase) +20° C., more preferably from room temperature +15° C. to clearing temperature +5° C.

Step of Orientation

Subsequently, the liquid crystal material in the laminate is oriented by subjecting the laminate to bending treatment. It is preferable to conduct the bending treatment by using one roll or a set of rolls. When one roll is used, the laminate alone or the laminate supported between two belts is moved and bent along the roll, with one surface of the laminate or one surface of the belts made into contact with the surface of the roll. It is desirable that the temperature of the roll is controllable so that it can be heated. When a set of rolls are used, the laminate alone or the laminate supported between two belts is moved through the roll, with the obverse and reverse of the laminate or the belts alternatively made into contact with the surfaces of the rolls. It is desirable that the temperature of at least one of the rolls is controllable so that it can be heated. The angle made by the axis of each roll and the direction in which the laminate moves towards the roll is not limited to 90°, and may be varied according to demand. For example, ferroelectric liquid crystal materials orient in the direction of the axis of roll. Therefore, when uniaxially oriented substrates and a ferroelectric liquid crystal material are used, it is desirable that the roll to be used for bending treatment is so arranged that the orientation direction of the liquid crystal material and the direction in which the substrates were stretched make approximately the tilt angle of the liquid crystal material.

The method of producing a liquid crystal optical device of the present invention can be conducted continuously and effectively by using the apparatus of the present invention.

Hereinafter, the apparatus of the present invention for producing a liquid crystal optical device will be described.

(a) Conveyer means for conveying a flexible substrate

The conveyer means conveys a flexible substrate through the steps of application, lamination, and orientation, successively. The preferred conveyer means is a device for supplying automatically a flexible substrate, which consists of a supply roll for supplying a flexible substrate and a winder roll for winding the flexible substrate on it.

Figure 5:
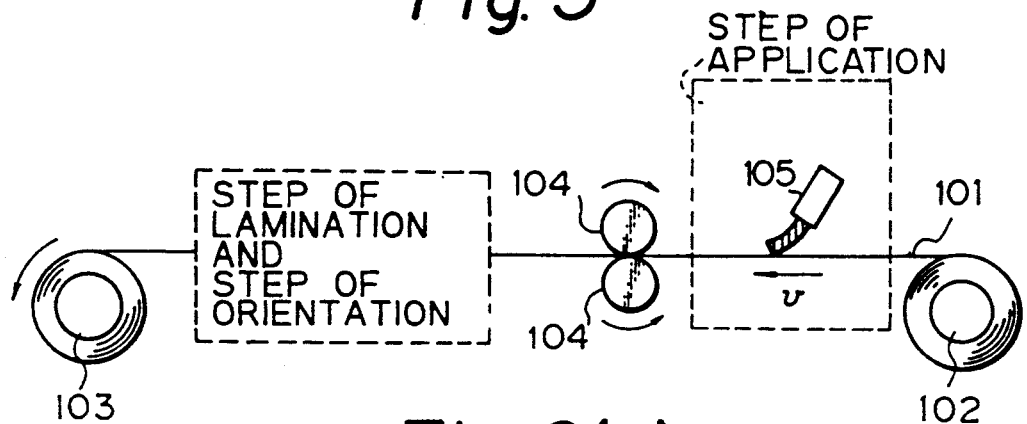
FIG. 5 illustrates a conveyer means for conveying a lengthy flexible substrate, of the apparatus according to an embodiment of the present invention.

FIG. 5 schematically shows an example of the device for supplying automatically a lengthy flexible substrate. A rolled lengthy flexible substrate 101 is conveyed by supplying the lengthy flexible substrate 101 from a supply roll 102 on which the lengthy flexible substrate 101 has been rolled, and winding the lengthy flexible substrate 101 on a winder roll 103. It is desirable to drive the device with the winder roll 103 and to equip the supply roll 102 with a brake or a driving motor for adjusting the tension of the lengthy flexible substrate 101. In cases where all the steps including application, lamination, and orientation are conducted continuously, one or more pairs of driving rolls 104 may be further arranged between the step of application and the winder roll 103, for example, between every two step adjoining each other, to assist the device conveying the lengthy flexible substrate 101. A reference numeral 105 represents an application head which consists of a container for containing a liquid crystal material in a state of isotropic liquid or solution and an impregnating matter attached to the bottoms of the container.

The supplying speed v of the lengthy flexible substrate 101 may be properly adjusted so as to obtain a film of the liquid crystal material having a predetermined thickness. The supplying speed needn't be always constant, and may be changed continuously, in steps, or intermittently, according to demand. In cases where protective film is attached to one or both surfaces of the lengthy flexible substrate 101, winder rolls for winding the protective film may be provided near the supply roll 102.

Examples of the desirable material of the supply roll 102, the winder roll 103, driving rolls 104, and the winder rolls for winding protective film include rubber, plastics, and metals. From the view point of durability, metals may be preferably used. In cases where pairs of driving rolls are used as supplement, at least one of each pair is preferably a rubber roll whereby a slip between the roll and the substrate can be prevented.

In cases where the flexible substrate used is a cut-sheet of flexible substrate, a conveyer belt may be suitably used as the conveyer means for conveying the flexible substrate.

Figure 6A:
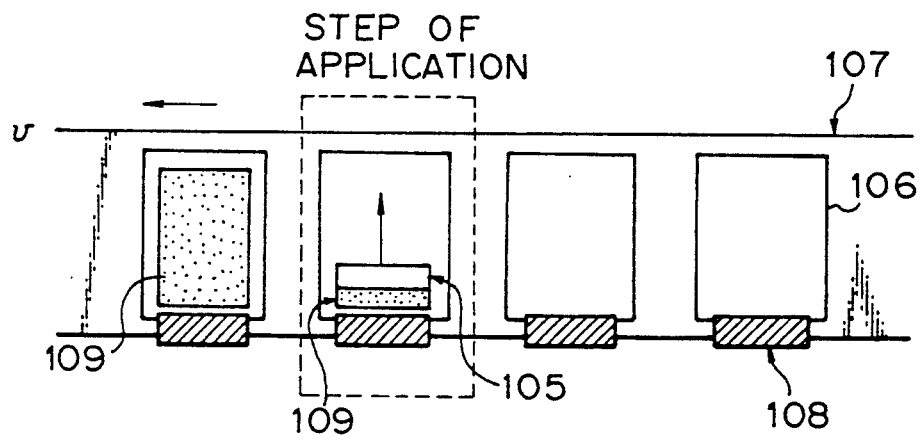
FIG. 6(a) and FIG. 6(b) illustrate conveyer means for conveying plural cut-sheets of flexible substrate, of the apparatus according to two embodiments of the present invention, respectively.

The automatic conveyer means shown in FIG. 6(a) comprises a conveyer belt 107 for conveying a cut-sheet of flexible substrate 106 and a clip 108 for fixing the cut-sheet flexible substrate 106 on the conveyer belt 107. Plural cut-sheet flexible substrates 106 are placed in a line on the conveyer belt 107, and the flexible substrates 106 are fed successively to an application device by moving the conveyer belt 107 for each application. The cut-sheet flexible substrates 106 under conveying needn't be fixed on the conveyer belt 107, but it is preferable to fix at least the cut-sheet flexible substrate 106 under application on the conveyer belt 107 with the clip 108 so as to prevent the cut-sheet flexible substrate from moving on the conveyer belt 107 while the substrate is in contact with the impregnating matter of the application head 105. A reference numeral 109 represents a film of a liquid crystal material coating the electrode side of the cut-sheet flexible substrate 106.

Figure 6B:
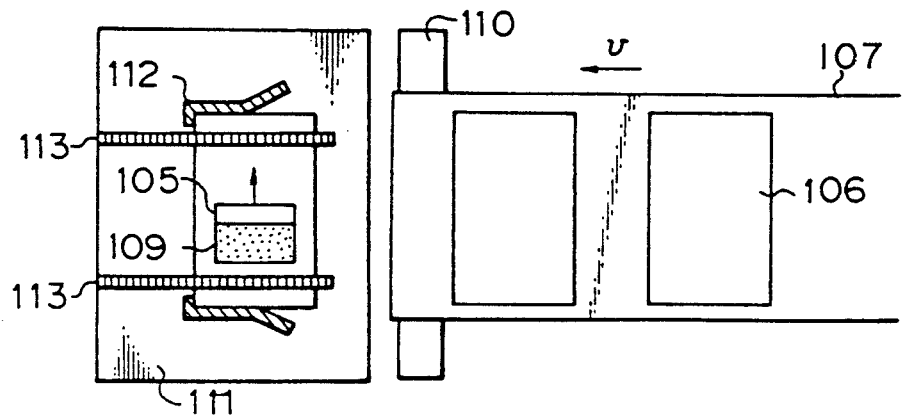

The conveyer means shown in FIG. 6(b) comprises a conveyer belt 107 and a roll 110 for turning the conveyer belt 107 back, and it supplies a cut-sheet of flexible substrate 106 on to an application bed 111. The cut-sheet flexible substrate 106 supplied on to the application bed 111 is fixed with two locating metal fittings 112 and two small size conveyer belts 113 for taking a coated flexible substrate out. A liquid crystal material is applied to the electrode side of the cut-sheet substrate fixed on the application bed 111, by pressing and moving an impregnating matter of an application head 105 to the electrode side of the substrate, thereby forming a film of the liquid crystal material. The flexible substrate coated with the film of liquid crystal material is taken out to the next step by the small conveyer belts 113.

The material of the belts used in these conveyer means may be of rubber, plastic or metal. The conveying speed v is changed intermittently so as to stop the conveyer belts for each application. The cut-sheet substrates may be placed on the conveyer belts at an angle, according to demand. Other than the above-described examples, vacuum, adhesion or the like may be used for fixing a flexible substrate during application or conveying.

(b) Application means for applying a liquid crystal material to a flexible substrate using an impregnating matter impregnated with the liquid crystal material By using an application means, a liquid crystal material is applied to the electrode side of the flexible substrate conveyed by the above-described conveyer means, to coat the electrode side of the flexible substrate with a film of the liquid crystal material. The following description concerns with the preferred embodiments of the application means including an intermittent application device and a variable supply device for controlling the liquid crystal material supply to the impregnating matter of the intermittent application device.

(1) intermittent application device

It is preferable that application of a liquid crystal material to a flexible substrate is so conducted intermittently as to adjust the application for the required width of application. Therefor, it is preferable to use an intermittent application device which can switch the impregnating matter between two states in which the impregnating matter is in contact with or out of contact with the electrode side of the flexible substrate. As previously described, such switching can be performed by moving the impregnating matter up and down against the flexible substrate, or moving the flexible substrate upward and downward against the application head, or moving the impregnating matter periodically round a stationary point over the electrode side of the flexible substrate.

FIG. 7(a) to FIG. 7(e) show examples of the intermittent application device.

Figure 7A:
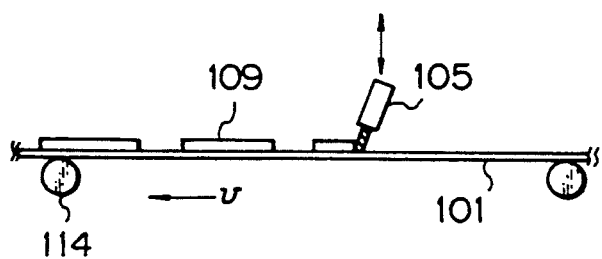
FIG. 7(a) and FIG. 7(b) are schematic side views illustrating intermittent application of a liquid crystal material to a flexible substrate being performed by moving an impregnating matter impregnated with the liquid crystal material up and down in a vertical line in accordance with two embodiments of the present invention, respectively.
Figure 7B:
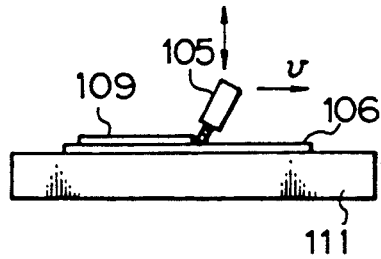

Each of FIG. 7(a) and FIG. 7(b) shows an example of a device for performing intermittent application by moving an impregnating matter attached to an application head 105 up and down.

When a rolled lengthy flexible substrate is used, as shown in FIG. 7(a), a film of a liquid crystal material 109 of a desired width can be formed on a lengthy flexible substrate 101 supported by two supplementary rolls 114 by moving the application head 105 up and down to fit the moving speed v of the lengthy flexible substrate 101 and the desired application width.

When a cut-sheet of flexible substrate is used, as shown in FIG. 7(b), a film of a liquid crystal material 109 of a desired width can be formed by moving an application head 105 up and down against a cut-sheet flexible substrate 106, which is supported on a stationary bed 111, to fit the light-and left motion of the application head 105 (moving speed v) and the desired application width.

Figure 7C:
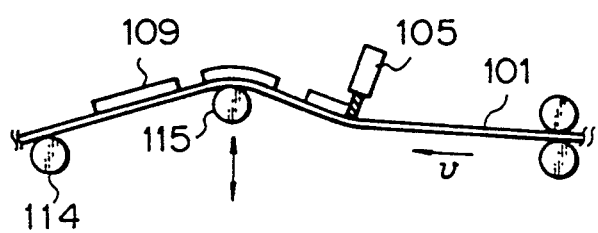
FIG. 7(c) and FIG. 7(d) are schematic side views illustrating intermittent application of a liquid crystal material to a flexible substrate being performed by moving the flexible substrate up and down in a vertical line in accordance with two embodiments of the present invention.
Figure 7D:
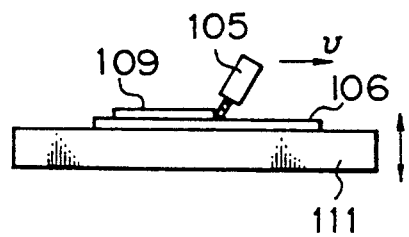

Each of FIG. 7(c) and FIG. 7(d) shows an example of a device for conducting intermittent application by moving the flexible substrate to be coated.

Referring to FIG. 7(c), the position of an application head 105 is fixed, and a rolled lengthy flexible substrate 101 is supported by two supplementary rolls 114 and a supplementary roll 115 movable up and down and is moved in a horizontal direction at a moving speed v. In this case, the supplementary roll 115 is moved up and down so as to adjust the up and down motion of the lengthy flexible substrate 101 for its moving speed v and the desired application width.

Referring to FIG. 7(d), a cut-sheet of flexible substrate 106 is used and is supported by a bed plate 111 movable up and down, and an application head 105 is moved in a horizontal line at a moving speed v. In this case, a film of a liquid crystal material 109 of a desired width is formed by moving the bed plate 111 up and down to fix the moving speed v of the application head 105 and the desired application width.

Figure 7E:
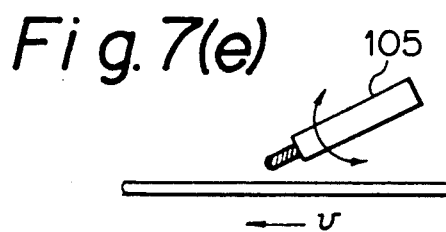
FIG. 7(e) is a schematic side view illustrating intermittent application of a liquid crystal material to a flexible substrate being conducted by periodically moving an impregnating matter impregnated with the liquid crystal material round a fixed point over the flexible substrate in accordance with an embodiment of the present invention.

FIG. 7(e) shows an example of a device for performing intermittent application by moving an impregnating matter attached to an application head 105 periodically round a stationary point. In either cases where a lengthy flexible substrate or a cut-sheet of flexible substrate is used, while a flexible substrate 101 is moved horizontally at a moving speed v, the application head 105 is moved periodically round a stationary point at a fixed distance from the electrode side of a flexible substrate 101 to fit the moving speed v of the flexible substrate 101 and the desired application width, thereby bringing the impregnating matter into contact with the electrode side of the flexible substrate 101 intermittently. The periodic move of the application head 105 may be either reciprocating motion or rotating motion.

The vertical motion of the roll or the bed plate supporting flexible substrates or of the application head (impregnating matter) or the periodic motion of the application head (impregnating matter) may be made by various means, such as combination of motors and gears, piston using oil or air pressure, or magnetic means.

(2) variable supply device

When intermittent application is conducted, it is preferable to make the delivery of a liquid crystal material in a state of an isotropic liquid state or of a solution to an impregnating matter variable depending on going and stopping of application lest the liquid crystal material should drip from the impregnating matter while application is stopped.

Figure 8A:
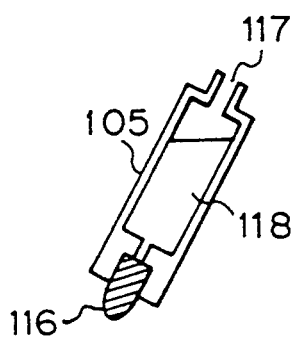
FIG. 8(a) is a schematically sectional view showing an example of a variable supply device of variable-internal pressure system, for supplying a liquid crystal material to an impregnating matter.
Figure 8B:
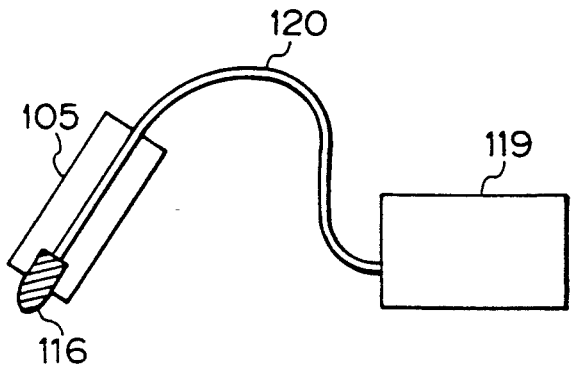
FIG. 8(b) is a schematically sectional view showing an example of a variable supply device including a variable delivery device, for supplying a liquid crystal material to an impregnating matter.

FIG. 8(a) and FIG. 8(b) show examples of variable supply device.

FIG. 8(a) shows an example of a variable delivery device of variable internal pressure system. An application head 105 consists of a rectangular container containing a liquid crystal material 118 and an impregnating matter 116 inserted into the bottom of the container 118. A hole 117 for controlling the internal pressure in the container is made in the upper side of the container. The internal pressure in the container is controlled by attaching a valve for controlling air flow or by connecting the hole 117 through a tube to a small size pump, thereby varying supply of the liquid crystal material 118 to the impregnating matter 116.

FIG. 8(b) shows an example of a variable supply device for supplying intermittently a fixed amount of liquid crystal material. An application head 105 is connected through a tube 120 to a delivery device 119 for delivering intermittently a fixed amount of liquid crystal material, and a liquid crystal material contained in the device 119 is directly supplied to an impregnating matter 116. The liquid crystal material required for single application may be supplied by single delivery or may be supplied by plural deliveries during the application. Commercial devices for delivering intermittently a fixed amount of liquid (dispensers) may be suitably used.

(c) lamination means for laminating the flexible substrate coated with the liquid crystal material with the other flexible substrate By using a lamination means, the flexible substrate coated with the liquid crystal material is laminated with another flexible substrate, with the liquid crystal material disposed between the electrode sides of the flexible substrates, to form a laminate. An example of the lamination means consists of at least a pair of lamination rolls whereby the liquid crystal material coated with the liquid crystal material and another flexible substrate are brought into contact with each other and at the same time pressed to each other. Although the material of the lamination rolls is not particularly limited, lamination can be efficiently performed without slipping by pairing one metal roll with one rubber roll. It is preferable that one roll of each pair of rolls is able to be heated. When at least one of the two flexible substrates used is a cut-sheet of flexible substrate, it is appropriate that one roll and a plate for supporting the cut-sheet flexible substrate are combined to use, in place of at least a pair of rolls. The pressing position between the roll and the plate is moved in one direction by moving the roll or the plate. Preferably, the roll or the plate is able to be heated. It is desirable that the flexible substrate without a film of liquid crystal material is heated during lamination so that the viscosity of the surface of the film of liquid crystal material decreases, thereby making the surface of the film of liquid crystal material more even.

(d) orientation means for orienting the liquid crystal material in the obtained laminate by subjecting the laminate to bending treatment The obtained laminate is subjected to bending treatment by using the orientation means to orienting the liquid crystal material in the laminate, and thus a finished liquid crystal optical device is obtained.

The orientation means uses shearing stress generated by bending treatment and excels in productivity. The preferred example of the orientation means consists of at least one orientation roll. A laminate alone or a laminate supported between two belts is subjected to bending treatment by bringing a surface of the laminate or the belts into contact with the surface of the orientation roll, and thus the liquid crystal material in the laminate is oriented. It is preferable that the temperature of at least one orientation roll is controllable. When two or more orientation rolls are used, it is desirable to heat the laminate with the first roll to a temperature at which the liquid crystal material exhibits isotropic phase, and then subject the laminate to bending treatment using the second roll while the laminate is cooled with the second roll to a temperature at which the liquid crystal material exhibits a liquid crystal phase. It is also possible to heat the laminate using other heating device in place of the orientation roll. The material of the orientation rolls is not particularly limited. From the viewpoint of durability, metal rolls may be suitably used. The shape of the orientation rolls are not particularly limited and may be varied properly depending on the size of the laminate, and so on.

(f) cutting means

According to demand, the apparatus for producing a liquid crystal material of the present invention may further contain a cutting means for cutting the oriented laminate into separate liquid crystal optical devices. By using the cutting means, a liquid crystal optical device having a desired size can be obtained.

When at least one of the flexible substrate used is a continuous flexible substrate, such as a lengthy flexible substrate, cutting is carried out after lamination to produce separate liquid crystal optical devices. The cutting means may be provided either before or after the orientation means.

An example of the cutting means consists of a device for feeding a laminate and a cutter for cutting the fed laminate into a predetermined size. When the laminate is cut perpendicularly to the feeding direction, cutting can be performed simply by feeding the laminate intermittently and synchronizing the move of the cutter to the intermittent feeding so as to cut the laminate while feeding is stopped. When the laminate is fed at a constant speed, the cutter, during cutting, is moved in the feeding direction at the same speed as the feeding speed, and after cutting, the cutter is returned to the position for starting the next cutting. The move of the cutter is repeated to repeat cutting. Other cutting means commonly used for cutting polymer sheet may be used.

Next, some embodiments of the apparatus of the present invention for conducting the above-described steps continuously will be described.

Figure 9:
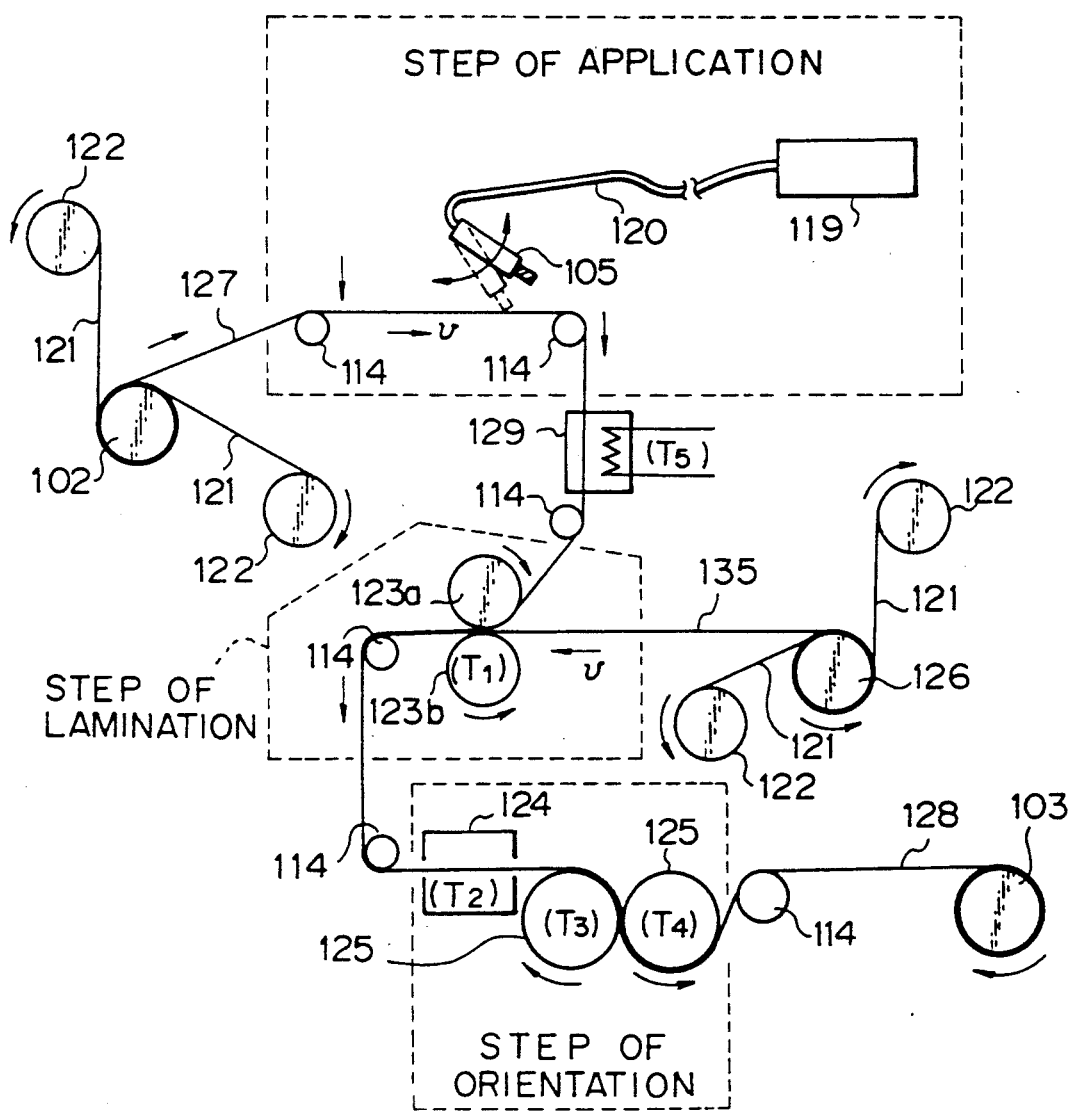
FIG. 9 illustrates an apparatus and a method for producing a liquid crystal optical device in accordance with the present invention, for particularly showing processes of producing a liquid crystal optical device using two rolled lengthy flexible substrates as the two flexible substrates to be used for the method.

FIG. 9 shows an embodiment of the apparatus in case both the two flexible substrates used are continuous flexible substrates, such as rolled lengthy flexible substrates.

By using the apparatus shown in FIG. 9, all steps of application, lamination, and orientation by bending treatment can be conducted continuously. The line of the apparatus is driven at a constant speed v by conveying a lengthy flexible substrate 127 at the speed v through all means (steps) using a supply roll 102 and a winder roll 103. A transparent, flexible substrate 127 bearing an electrode structure is supplied from the supply roll 102. Two protective films 121 are respectively wound on two winder rolls 122 provided near the supply roll 102. To the electrode side of the flexible substrate 127 after removal of the protective films 121, applied intermittently was a liquid crystal material using an application head 105, which is supporting at its bottom an impregnating matter impregnated with the liquid crystal material. The application head 105 is connected through a tube 120 to a delivery device 119 for delivering intermittently a fixed amount of liquid crystal material. Delivering of the liquid crystal material, which is in a state of an isotropic liquid state or of a solution, from the delivery device 119 is synchronized with the move of the application head 105 so that a fixed amount of the liquid crystal material is fed to the impregnating matter equipped to the end of the application head 105 only while the impregnating matter is in contact with the electrode side of the flexible substrate 127. When a solution of liquid crystal material is used, the applied solution was dried in a warm-air drier 129 to form a film of the liquid crystal material.

Subsequently, another flexible substrate 135 bearing an electrode structure is laminated with the coated substrate 127 by using a lamination means consisting of two lamination rolls 123a and 123b, to form a laminate with the film of liquid crystal material disposed between the two electrode structures. The flexible substrate 135 is supplied from a supply roll 126 after two protective films 121 are removed from the substrate by winding them respectively on two winder rolls 122. The obtained laminate is heated in a heating furnace 124 to a temperature at which the liquid crystal material exhibits isotropic phase, and is then fed to an orientation means consisting of two orientation rolls 125 and subjected to bending treatment on the two orientation rolls 125 while it is cooled with the rolls 125 to a temperature at which the liquid crystal material exhibits a liquid crystal phase. The laminate 128 after orientation treatment is wound on the winder roll 103. Plural supplementary rolls 114 are arranged at proper positions. Thereafter, the laminate 128 is cut into liquid crystal optical devices of a desired size.

Figure 10:
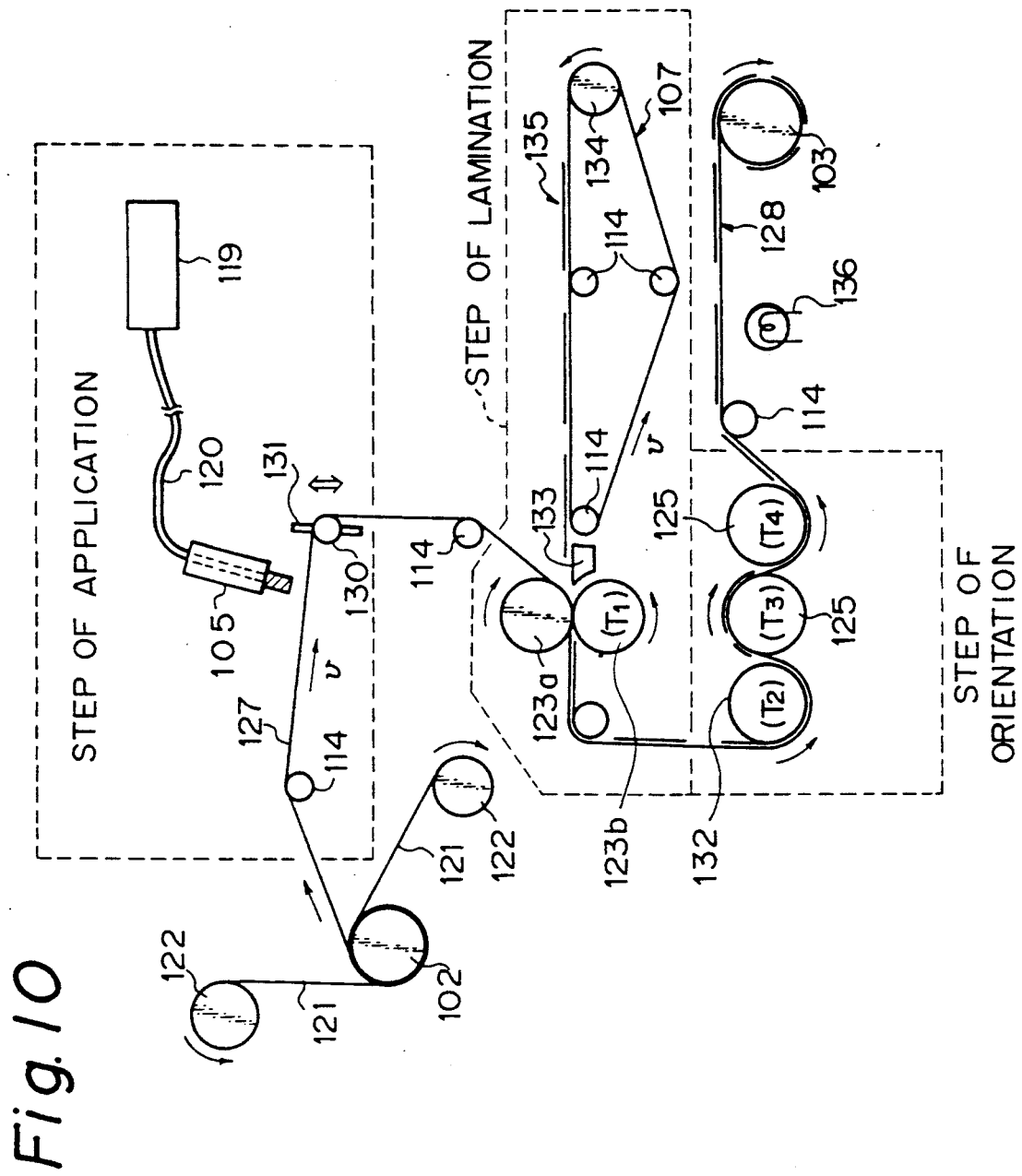
FIG. 10 illustrates an apparatus and a method for producing a liquid crystal optical device in accordance with an embodiment of the present invention, for particularly showing processes of producing a liquid crystal optical device using a rolled lengthy flexible substrate and a cut-sheet of flexible substrate as the two flexible substrates to be used for the method.

FIG. 10 shows an embodiment of the apparatus of the present invention to be used in case one of the two flexible substrates used is a lengthy flexible substrate and the other is cut-sheet of substrate which has been previously cut into a desired size.

The line of the device is driven at a constant speed v by conveying a transparent, lengthy, flexible substrate 127 at the constant speed v using a conveyer means consisting of a supply roll 102 and a winder roll 103. The application means used in the apparatus is similar to that shown in FIG. 9 with the proviso that intermittent application is performed by moving the lengthy flexible substrate 127 up and down by moving a roll 130 up and down along the slit 131 for moving the roll 130. A reference numeral 135 represents a cut-sheet of flexible substrate bearing an electrode structure to be laminated with the lengthy flexible substrate 127. The cut-sheet flexible substrate 135 is fed by a conveyer belt 107 at a speed close to the line speed v, and fed through a supplementary bed 133 to a lamination means consisting of a pair of lamination rolls 123a and 123b. The coated lengthy, flexible substrate 127 and the cut-sheet flexible substrate 135 are laminated by the lamination rolls 123a and 123b to form a laminate with the film of liquid crystal material disposed between the electrode structures of the two flexible substrates 127 and 135. The obtained laminate is fed to an orientation means consisting of one heating roll 132 and two rolls 125 both for orienting and for cooling, and, in accordance with the same principle as that of the apparatus shown in FIG. 9, the laminate is subjected to orientation treatment by means of bending treatment using the roll 132 and the two rolls 125, to orient the liquid crystal material therein. A reference numeral 136 represents a UV lamp. When an adhesive is used, the laminate 128 after orientation treatment is heated with the UV lamp 136 to cure the adhesive, and is then wound on the winder roll 103. Thereafter, the laminate 128 is cut into liquid crystal optical devices having a desired size.

Figure 11A:
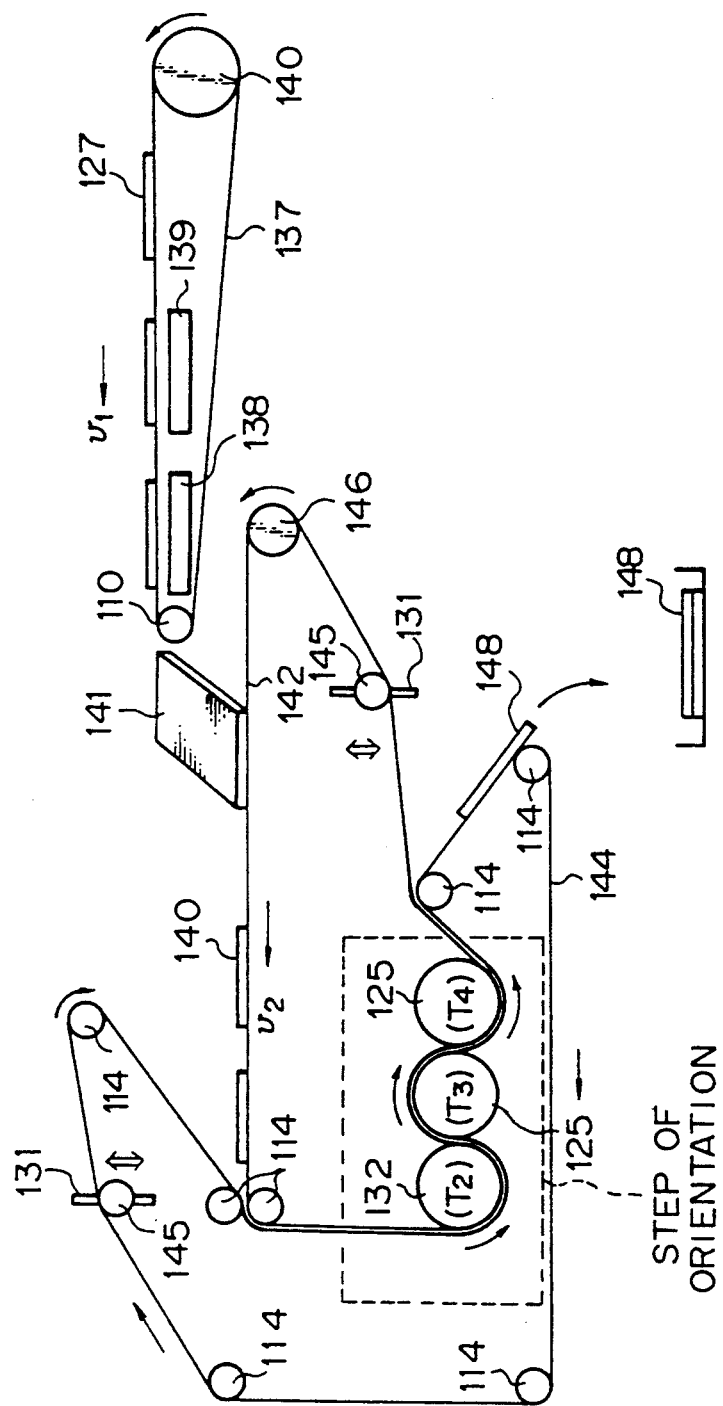
FIG. 11(b), FIG. 11(c), and FIG. 11(d) are schematic views illustrating three types of the part of application and lamination shown in FIG. 11(a).

FIG. 11(a), FIG. 11(b), FIG. 11(c), and FIG. 11(d) show an embodiment of the apparatus of the present invention to be used in case both the two flexible substrates used are cut-sheet substrates. FIG. 11(a) is a general view of the apparatus, and the application part and the lamination part of the apparatus are shown in detail in FIG. 11(b), FIG. 11(c), and FIG. 11(d).

Figure 11B:
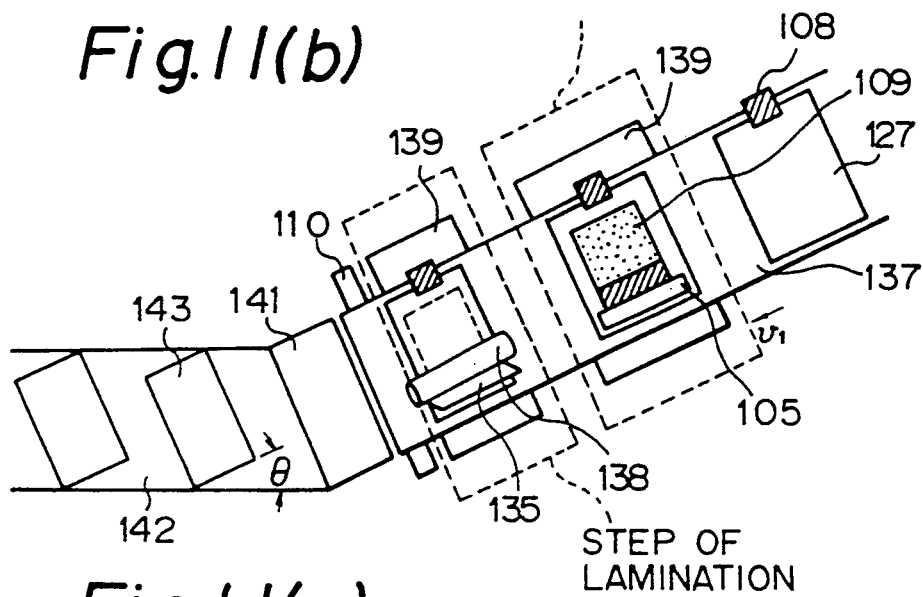
Figure 11C:
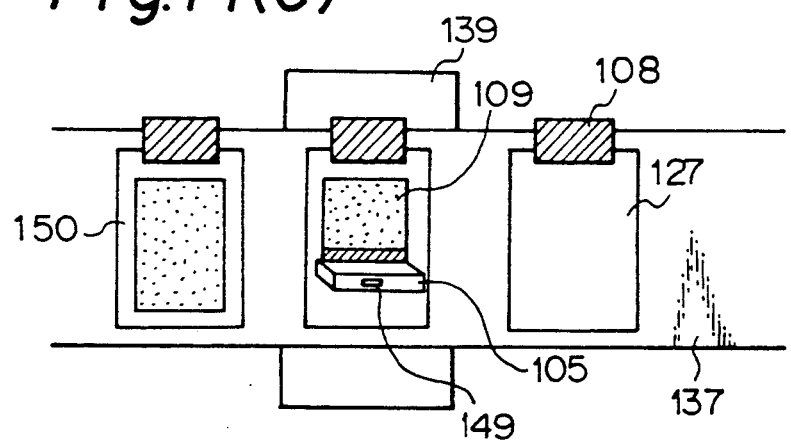

Referring to FIG. 11(a) and FIG. 11(b), a transparent, cut-sheet flexible substrate 127 bearing a transparent electrode structure is placed on a conveyer belt 137 for conveying the flexible substrate 127 to application means and lamination means, and is fixed on the conveyer belt 127 with a clip 108, with the electrode side thereof looking upward. The clip 108 has a mechanism for separating it automatically when it reaches a roll 110 for turning the convey belt 137 back before a bed 141 for sliding the substrate down. The belt 137 is turned back by the roll 110, and returns to a driving roll 140 for driving the conveyer belt 137 (FIG. 11(a)). The conveyer belt 137 moves intermittently at a conveying speed $v_1$, and, while the conveyer belt 137 is stopped, application of liquid crystal material and lamination are carried out using an application head 105 and a lamination roll 138, respectively. In each of the application part and the lamination part shown in FIG. 11(b), the cut-sheet flexible substrate 127 is supported by an aluminum plate 139 provided under the conveyer belt 137. On the aluminum plates 139, application and lamination are carried out. A reference numeral 109 represents a film of liquid crystal material applied to the cut-sheet substrate using the application head 105. A reference numeral 135 represents a cut-sheet of flexible substrate to be laminated with the coated cut-sheet flexible substrate 127. The application head 105 shown in FIG. 11(c) is equipped with a valve 149 for controlling the internal pressure in its container portion. In FIG. 11(c), a reference numeral 150 represents a substrate coated with a film of liquid crystal material.

Figure 11D:
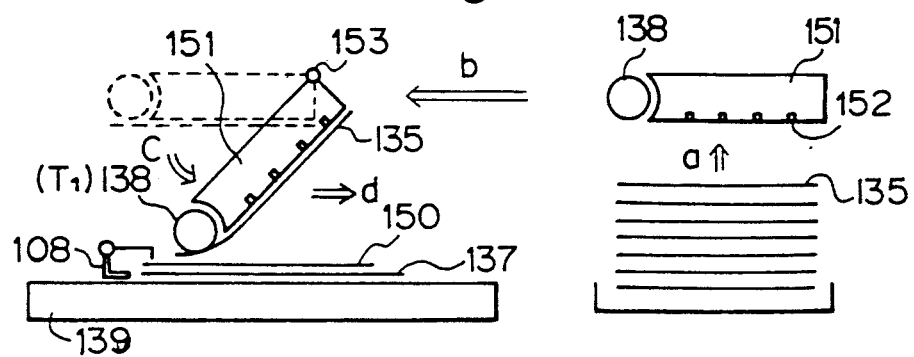

FIG. 11(d) illustrates a means for supplying the other cut-sheet flexible substrate to be laminated with the coated cut-sheet flexible substrate. As shown in FIG. 11(d), the cut-sheet flexible substrate 135 is supplied using an absorbing plate 151 having a mechanism for absorbing a substrate. The absorbing plate 151 is provided with plural holes 152 for absorbing by vacuum a cut-sheet of flexible substrate 135, and is equipped with a lamination roll 138. The absorbing plate 151 absorbing a flexible substrate 135 is moved up as shown by an arrow 'a', then moved to lamination part as shown in an arrow 'b'. Subsequently, the absorbing plate 151 is rotated round a supporting shaft 153 in the direction shown by an arrow 'c', thereby bringing an end of the flexible substrate 135 into contact with an end of the coated flexible substrate 150. The absorbing plate 151 is then moved in the direction shown by an arrow 'd', and the flexible substrate 135 is laminated on the film of liquid crystal material coating the flexible substrate 150 by the lamination roll 138.

As shown in FIG. 11(a) and FIG. 11(b), thus obtained laminate 143 slides down the surface of the sliding plate 141 and is mounted on a conveyer belt 142 both for conveying the laminate 143 and for aiding orientation. The conveying speed (orientation speed) $v_2$ of the conveyer belt 142 is constant. In FIG. 11(b), the laminate 143 is placed on the conveyer belt 142 obliquely at an angle '$\theta$, but the angle $\theta$ may be varied depending on the conditions of orientation. The laminate 143 is sandwiched between the conveyer belt 142 and a supplementary belt 144, as shown in FIG. 11(a), and is fed to an orientation means. The orientation means in this apparatus is identical with that shown in FIG. 10. The tension of the conveyer belt 142 and the supplementary belt 144 may be controlled by moving a tension controlling roll 145 along a slit 131 for moving a roll. The obtained oriented liquid crystal optical device 148 is a cut-sheet which needn't be cut.

EXAMPLES 1 TO 5

EXAMPLE 1

In this Example, a ferroelectric liquid crystal composition consisting of the following polymeric liquid crystal ingredient, which consists essentially of the following repeating structure and has the following properties, and the following resin ingredient was used as the liquid crystal material.

Liquid crystal ingredient

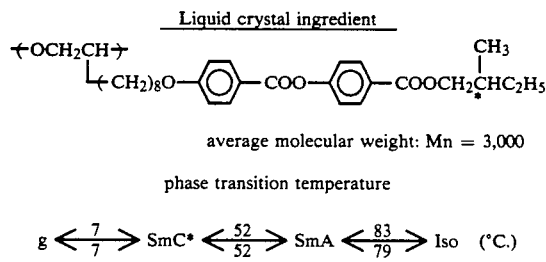

average molecular weight: Mn = 3,000 phase transition temperature $$g \xrightarrow[7]{7} SmC^* \xrightarrow[52]{52} SmA \xrightarrow[79]{83} Iso \quad (°C.)$$

(g: glass state, SmC*: chiral smectic C phase, SmA: smectic A phase, Iso: isotropic phase)

Resin ingredient

A mixture of EPICOAT 834 (trade name, an epoxy resin produced by Yuka Shell Epoxy Co., Ltd.) and QX-11 (trade name, a hardening agent produced by Yuka Shell Epoxy Co., Ltd.) with weight ratio 5:3
liquid crystal ingredient:resin ingredient = 70:30 (% by weight)

The above-described liquid crystal material was dissolved in dichloromethane to form a solution having a concentration of 20% by weight.

In this Example, two polyether sulfone (PES) substrates (FST-1351, trade name, produced by Sumitomo Bakelite Co., Ltd., thickness: 100 μm, width: 150 mm) bearing their respective patterned ITO electrodes were used, and application was carried out in the same manner as shown in FIG. 1 using an application head 1 as shown in FIG. 2. The application head 1 consists of a metal container 5 and an impregnating matter 7, which was a porous wiper for clean room (BELLCLEAN (trade name) produced by Kanebo, Ltd.) attached to the bottom of the container 5. The solution was poured into the container 5, thereby impregnating the impregnating matter 7 with the solution. The solution was applied to the electrode side of the substrate 2 by moving the application head 1 on the electrode side in one direction at a moving speed v while a load w was applied on the application head 1 under the following conditions.
Width of the impregnating matter 7: 140 mm
Angle between the impregnating matter 7 and the substrate 2: α=45°
Moving speed: v=10 cm/sec
Load: w=1 kg After the solvent was removed out by drying, the obtained film of liquid crystal material had a thickness of about 2.5 μm, and the surface of the film was observed visually to be even without irregularlity of thickness.

Subsequently, the other PES substrate was laminated on the film surface of the coated substrate by using a pair of rolls, the surface temperature of which was heated to 40° C., to form a laminate. The obtained laminate was subjected to orientation treatment by carrying out bending treatment in the same manner as shown in FIG. 11(a) using three rolls ($T_2$: 88° C., $T_3$: 75° C., $T_4$: 50° C.), to obtain a liquid crystal optical device.

The obtained liquid crystal optical device was so disposed between two polarizing plates in cross polarization condition that the orientation direction made 45° with the polarizing axes, and coloring caused by birefringence was checked for. The result made it clear that the film of the liquid crystal material had a very even thickness, since the whole of the device was slightly yellowish white and no color shading was observed.

When the angle between the orientation direction and one polarizing axis was changed to 22.5° and voltages of ±5 V were applied to the electrodes, which had been previously attached to the insides of the substrates and patterned into stripes of 0.45 mm pitch, contrast ratio was measured to be 55, and good bistability was exhibited. Further, no accidental continuity was occured at every dot.

EXAMPLE 2

In this Example, a ferroelectric liquid crystal composition consisting of the following liquid crystal ingredient, which is a liquid crystal mixture of a polymer liquid crystal consisting essentially of the following repeating structure and having the following properties and a low molecular weight liquid crystal having the following structure, and the following resin ingredient was used as the liquid crystal material.

Liquid crystal ingredient

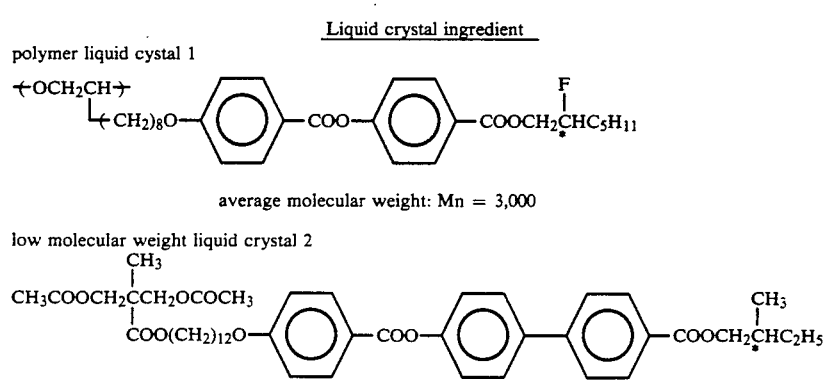

average molecular weight: Mn = 3,000

-continued

Liquid crystal ingredient liquid crystal 1:liquid crystal 2 = 30:70 (mol %)

phase transition temperature

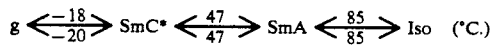

Resin ingredient

CEMEROCK SUPER Y-862-1 (trade name, an acrylic UV-curing adhesive, produced by Cemedine Co., Ltd.)

liquid crystal ingredient: resin ingredient=80:20 (% by weight)

The above-described liquid crystal material was dissolved in 1,1,1-trichloroethane to form a solution having a concentration of 15% by weight.

In this Example, two uniaxially stretched PET substrates (trade name: CELEC-K, produced by Daicel Chemical Industry, Ltd., thickness: 100 μm, width: 30 cm, length: 1 m) bearing their respective ITO electrodes were used, and application was carried out using an apparatus as shown in FIG. 3. As shown in FIG. 4, the application head 1 consists of a metal container 5 of 30 mm diameter and 25 cm width and an impregnating matter 7 of KIMTEC (trade name, produced by Jujo Kimberly Co., Ltd.), and a number, 26, of minute holes 8 of 1 mm φ were arranged in the bottom portion of the container 5 with separation, distance 1 cm. The supporting means 11 and 12 shown in FIG. 3 were movable from side to side so that the tension of the substrate could be controlled. In this Example, the tension of substrate was adjusted to 3 kg. The solution was poured into the metal container 5 from the hole 9 both for pouring liquid crystal material and for controlling the internal pressure, and the internal pressure in the metal container 5 was adjusted to atmospheric pressure. The moving speed v of the application head 1 and the load w applied on the application head 1 were 20 cm/sec and 600 g, respectively.

After removal of the solvent by drying, the obtained film of liquid crystal material was about 2.1 μm, and the surface was glossy and even.

Subsequently, the other substrate was laminated on the coated substrate in the same manner as in Example 1, and the obtained laminate was subjected to orientation treatment in the same manner as in Example 1, with the proviso the optically main axis of the PET substrates (uniaxially orienting direction) and the orientation direction of the liquid crystal material were so arranged that they made approximately the tilt angle of the liquid crystal material, 22°. After the orientation treatment, UV light was irradiated to the oriented laminate for about 5 seconds using a 400 W metal halide lamp, to cure the resin ingredient in the liquid crystal material.

A liquid crystal optical device of about 5 cm square was cut from the oriented laminate, and was disposed between two polarizing plates. Contrast ratio was measured to be 60 under the conditions of 25° C. and applied voltages of ±5 V. Further, good bistability was confirmed by the fact that the change of light transmittance 24 hours after switching off of voltage was about 6%. There was observed no color shading due to birefringence.

EXAMPLE 3

A ferroelectric liquid crystal optical device was produced using an apparatus as shown in FIG. 9.

In this Example, a ferroelectric liquid crystal composition consisting of the following polymeric liquid crystal ingredient, which consists essentially of the following repeating structure and has the following properties, and the following resin ingredient was used as the liquid crystal material.

Liquid crystal ingredient

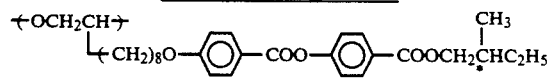

average molecular weight: Mn = 3,000 phase transition temperature

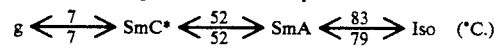

Resin ingredient main agent: EPICOAT 834 hardening agent: QX-11 main agent: hardening agent=60:40 (% by weight)

liquid crystal ingredient: resin ingredient=70:30 (% by weight)

In this Example, two lengthy PES substrates (FST-1351, trade name, produced by Sumitomo Bakelite Co., Ltd., thickness: 100 μm, width: 28 cm) bearing their respective ITO electrode structures were used.

A 10% by weight solution of the above-described liquid crystal material dissolved in dichloromethane was charged into the delivery device 119 for delivering intermittently a fixed amount of liquid crystal material, and 2.7 cc of the solution was supplied to the application head 105 every time application was carried out. The application head 105 was equipped with an impregnating matter which was cut from BELLCLEAN (trade name, produced by Kanebo, Ltd.) into a width of 25 cm, and the solution was applied to the electrode side of the substrate 127 through the distance about 40 cm at every application.

After completion of lamination and orientation under the following conditions, the obtained oriented laminate was wound on the winder roll 103. After the adhesive resin ingredient completed curing, i.e. about 30 minutes after winding, a liquid crystal optical device of 25 cm×40 cm was cut from the oriented laminate. The thickness of the film of liquid crystal material was about 2.3 μm.

The lamination roll 123a was a rubber roll of 80 mm diameter and 300 mm width, the lamination roll 123b was a chromium-plated iron roll of 80 mm diameter and 300 mm width, the two rolls 125 both for orienting and for cooling were chromium-plated iron rolls of 80 mm diameter and 300 mm width, and the supplementary rolls 114 were chromium-plated iron rolls of 40 mm diameter and 300 mm width.

Line speed: v=2.2 m/min
Temperature of the lamination roll 123b: $T_1=40°$ C.
Temperature of the heating furnace 124: $T_2=85°$ C.
Temperature of the rolls 125: $T_3=76°$ C., $T_4=70°$ C.
Temperature of the warm-air drier 129: $T_5=40°$ C.

A good contrast ratio of 46 was measured under cross polarization condition by applying voltages of ±5 V on the electrode structures. Further, no irregularlity of contrast nor color shading due to irregularlity of thickness was observed all over the device.

EXAMPLE 4

A ferroelectric liquid crystal optical device was produced using an apparatus as shown in FIG. 10.

In this Example, a ferroelectric liquid crystal composition consisting of the following liquid crystal ingredient, which is a liquid crystal mixture of a polymer liquid crystal consisting essentially of the following repeating structure and having the following properties and a low molecular weight liquid crystal having the following structure, and the following resin ingredient was used as the liquid crystal material.

cut from the obtained oriented laminate, and the film of liquid crystal material in the device was measured to be 2.1 μm in thickness.

The conditions of lamination and orientation were as follows.

The lamination roll 123a was a rubber roll of 80 mm diameter and 300 mm width, the lamination roll 123b was a chromium-plated iron roll of 80 mm diameter and 300 mm width, the heating roll 132 was a chromium-plated iron roll of 80 mm diameter and 300 mm width, the two rolls 125 both for orienting and for cooling were chromium-plated iron rolls of 80 mm diameter and 300 mm width, the moving roll 130 for performing intermittent application was a chromium-plated iron roll of 40 mm diameter and 300 mm width, the driving roll 134 for conveying substrate to be laminated on the coated substrate was a rubber roll of 50 mm diameter and 300 mm width, and the supplementary rolls 114 were chromium-plated iron rolls of 40 mm diameter and 300 mm width. The supplementary bed 133 was aluminum bed, the surface of which had been Teflon-finished so that substrates slide smoothly.

Liquid crystal ingredient polymer liquid cystal A

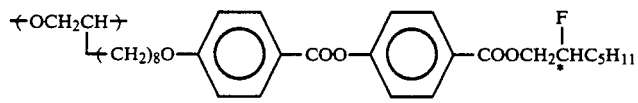

average molecular weight: Mn = 3,000 low molecular weight liquid crystal B

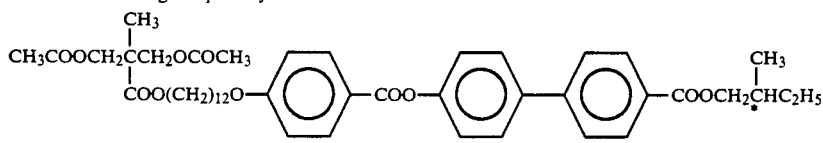

liquid crystal A:liquid crystal B = 30:70 (mol %)

phase transition temperature

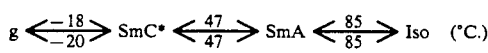

Resin ingredient
CEMEROCK SUPER Y-862-1 (trade name, an acrylic UV-curing adhesive, produced by Cemedine Co., Ltd.)
liquid crystal ingredient: resin ingredient = 80:20 (% by weight)

In this Example, the same PET substrates bearing ITO as those used in Example 3 were used.

Intermittent application was conducted using a 15% by weight solution of the above-described liquid crystal material dissolved in dichloromethane in the same manner as in Example 3. Delivery of the solution was 1.8 cc at every application, and the solution was applied through the distance 40 cm with a width of 25 cm. The same impregnating matter as that used in Example 1 was used.

Immediately upon orientation treatment, the adhesive resin ingredient was cured by irradiating UV light using the metal halide lamp 36. After winding, a device was Line speed: v=3 m/min
Temperature of the lamination roll 123b: $T_1=45°$ C.
Temperature of the heating roll 132: $T_2=88°$ C.
Temperature of the two rolls 125: $T_3=81°$ C., $T_4=55°$ C.

A contrast ratio of 55 was measured at room temperature under cross polarization condition by applying voltages of ±5 V on the electrode structures. Further, no irregularlity of contrast nor color shading was observed all over the device.

EXAMPLE 5

A ferroelectric liquid crystal optical device was produced using an apparatus as shown in FIG. 11(a).

A liquid crystal material was prepared by mixing a ferroelectric liquid crystal material, which consist of the following repeating structure and has the following properties, and the following dichromatic coloring matter.

Liquid crystal ingredient

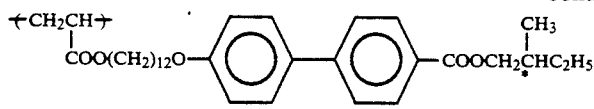

average molecular weight: Mn = 5,300 phase transition temperature

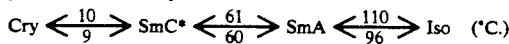

(Cry: crystal phase)

Dichromatic coloring matter

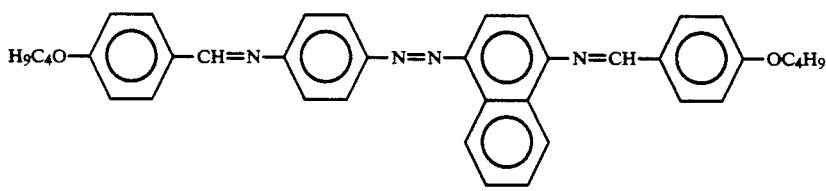

liquid crystal ingredient:dichromatic coloring matter=99.5:0.5 (% by weight)

In this Example, two uniaxially stretched PET substrates (CELEC-K, trade name, produced by Daicel Chemical Industries, Ltd., thickness: 100 μm, width: 200 mm) bearing their respective ITO electrode structures were used.

Application and lamination were carried out in the same manner as shown in FIG. 11(b).

Application was carried out using a 10% by weight solution of the above-described liquid crystal material dissolved in chloroform. The impregnating matter used was CREW (trade name, produced by Jujo Kimberly Co., Ltd.) of 180 mm width. The application head 105 was provided with a valve 149 for controlling internal pressure as shown in FIG. 11(c) lest the solution should drip from the application head 105. After lamination and orientation, a liquid crystal material enclosing a film of the liquid crystal material was obtained. The thickness of the film of liquid crystal material was 2.5 μm.

The lamination and orientation were carried out under the following conditions.

The lamination roll 138 was a silicone rubber roll of 20 mm diameter and 400 mm width, the heating roll 132 was a chromium-plated iron roll of 80 mm diameter and 300 mm width, the two rolls 125 both for orienting and for cooling were chromium-plated iron roll of 80 mm diameter and 300 mm width, the roll 110 for turning conveyer belt back was a chromium-plated iron roll of 40 mm diameter and 300 mm width, the roll 145 for controlling tension was a chromium-plated iron roll of 40 mm diameter and 300 mm width, and the supplementary rolls 114 were chromium-plated iron rolls of 40 mm diameter and 300 mm width.

Conveying speed in the stages of application and lamination: switched intermittently between $V_1=2$ m/min and 0 m/min Orienting speed: $V_2=8$ m/min Temperature of the lamination roll 138: $T_1=50°$ C.

Temperature of the heating roll 132: $T_2=100°$ C.

Temperature of the two rolls 125: $T_3=90°$ C., $T_4=82°$ C.

Arranging angle: $\theta=22.5°$

A contrast ratio of 40 was measured at room temperature under cross polarization condition by applying voltages of ±5 V on the electrode structures. When only one polarizing plate was used to change the mode to guest host mode, a good contrast ratio of 18 was measured. Further, irregularity of contrast or color shading was hardly observed.

What is claimed is:

1. An apparatus for producing a liquid crystal optical device wherein a ferroelectric liquid crystal material is enclosed between and in direct contact with two flexible substrates having on their surfaces facing each other their respective electrode structure, comprising:

(a) a conveyor means for conveying one of the flexible substrates separately;

(b) application means for applying the ferroelectric liquid crystal material directly to a side of the flexible substrate bearing the electrode structure which is conveyed by the conveyor means using an impregnating matter impregnated with the ferroelectric liquid crystal material, said application means including an applicator head for pressing said impregnating matter against the electrode-bearing side of the flexible substrate;

(c) a lamination means for laminating the flexible substrate coated with the ferroelectric liquid crystal material with the other flexible substrate of the two flexible substrates, with the ferroelectric liquid crystal material disposed between the electrode-bearing sides of the flexible substrates and in contact with the electrode-bearing sides of the flexible substrates, to form a laminate; and (d) an orientation means for orienting the ferroelectric liquid crystal material in the laminate which includes means for heating the laminate and means for subjecting the laminate to a bending action during cooling of the heated laminate, the bending action of the laminate being conducted by bending the laminate along a cylindrical surface of a roll having an axis so that the ferroelectric liquid crystal material is oriented along a direction in which the axis of the roll extends.

2. The apparatus as claimed in claim 1, wherein the lamination means for laminating the flexible substrate coated with the liquid crystal material with the other flexible substrate comprises at least a pair of rolls.

3. The apparatus as claimed in claim 2, therein a temperature of at least one roll of at least a pair of rolls is controllable.

4. The apparatus as claimed in claim 1, wherein the lamination means for laminating the flexible substrate coated with the liquid crystal material with the other flexible substrate comprises at least one plate and at least one roll.

5. The apparatus as claimed in claim 4, wherein a temperature of at least one plate or a temperature of at least one roll is controllable.

6. The apparatus as claimed in claim 1, wherein the flexible substrate conveyed by the conveyor means is a lengthy flexible substrate, and the conveyor means comprises a supply roll from which the lengthy flexible substrate is supplied and a winder roll on which the lengthy flexible substrate is wound.

7. The apparatus as claimed in claim 1, wherein the conveyor means is a conveyor belt.

8. The apparatus as claimed in claim 1, wherein the application means includes a means for controlling the amount of the liquid crystal material with which the impregnating matter is impregnated.

9. The apparatus as claimed in claim 1, wherein the orientation means comprises at least one roll.

10. The apparatus as claimed in claim 9, wherein a temperature of at least one roll is controllable.

11. The apparatus as claimed in claim 1, wherein the orientation means comprises a heating device and at least one roll having a cylindrical surface, the heating device being means for heating the laminate to a temperature at which the ferroelectric liquid crystal material exhibits isotropic phase, the at least one roll being means for bending the laminate along a cylindrical surface, and further comprising means for controlling a temperature of the at least one roll to cool the laminate to a temperature at which the ferroelectric liquid crystal material exhibits a liquid crystal phase.

12. The apparatus as claimed in claim 11, wherein the heating device is a heating furnace and the laminate is heated to a temperature at which the ferroelectric liquid crystal material exhibits isotropic phase while the laminate is passing through the heating furnace.

13. The apparatus as claimed in claim 11, wherein the heating device is a heating roll having a cylindrical surface, and the laminate is heated to a temperature at which the ferroelectric liquid crystal material exhibits isotropic phase while the laminate is being bent along the cylindrical surface of the heating roll.

14. The apparatus as claimed in claim 1, wherein the application means includes means for pressing the impregnating matter impregnated with the liquid crystal material at a pressure of not more than 3 kg/cm$^2$, said ferroelectric crystal material being in a state of isotonic liquid or in a state of solution prepared by dissolving the ferroelectric liquid crystal material in a solvent; the side of the flexible substrate in contact with the impregnating matter being moved at a speed of not more than 20 m/sec;

the lamination means for laminating the flexible substrate coated with the ferroelectric liquid crystal material with the other flexible substrate operates at a speed of 0.5 to 10 m/min., at a pressure of 0 to 5 kg/cm$^2$ and at a temperature of room temperature plus 10° C. to cleaning temperature of the ferroelectric crystal material plus 20° C. to form said laminate, and the orientation means includes means for heating the laminate to a temperature at which the ferroelectric liquid crystal material exhibits isotropic phase and means for subjecting the laminate to the bending treatment while the laminate is being cooled to a temperature at which the ferroelectric liquid crystal material exhibits a liquid crystal phase.

15. The apparatus as claimed in any one of claims 1, 2, 7, 8, 9, 11, 12, and 13, wherein at least one of the flexible substrates is a lengthy flexible substrate, and a cutting means for cutting the lengthy flexible substrate is further included before the lamination means.

16. The apparatus as claimed in any one of claims 1, 2, 5, 7, 8, 9, 11, 12, and 13, wherein at least one of the flexible substrates is a lengthy flexible substrate, and a cutting means for cutting the lengthy flexible substrate is further included after the lamination means.

* * * * *